US011551575B1

(12) United States Patent
Knighton et al.

(10) Patent No.: US 11,551,575 B1
(45) Date of Patent: Jan. 10, 2023

(54) INTELLIGENT COOKING PROCESS FLOW

(71) Applicant: Cooksy Corporation, Tucson, AZ (US)

(72) Inventors: Jeffery Forbes Knighton, Vail, AZ (US); Seth Marks, Benson, AZ (US); Steven Cartwright, Omaha, NE (US)

(73) Assignee: COOKSY CORPORATION, Tucson, AZ (US)

( * ) Notice: Subject to any disclaimer, the term of this patent is extended or adjusted under 35 U.S.C. 154(b) by 0 days.

(21) Appl. No.: 17/694,347

(22) Filed: Mar. 14, 2022

Related U.S. Application Data

(60) Provisional application No. 63/221,392, filed on Jul. 13, 2021.

(51) Int. Cl.
*G09B 19/00* (2006.01)
*G09B 5/06* (2006.01)
*G06V 20/52* (2022.01)
*G06F 40/40* (2020.01)

(52) U.S. Cl.
CPC .......... *G09B 19/003* (2013.01); *G06F 40/40* (2020.01); *G06V 20/52* (2022.01); *G09B 5/065* (2013.01)

(58) Field of Classification Search
CPC ............................. G09B 19/003; G09B 5/065
See application file for complete search history.

(56) References Cited

U.S. PATENT DOCUMENTS

| | | | |
|---|---|---|---|
| 9,791,936 B1 * | 10/2017 | Kovach | G06T 19/006 |
| 2017/0238749 A1 * | 8/2017 | Vengroff | A47J 36/321 |
| 2018/0137775 A1 * | 5/2018 | Byron | G09B 5/02 |
| 2019/0114941 A1 * | 4/2019 | Shimaoka | G06F 3/167 |

FOREIGN PATENT DOCUMENTS

| | | | | |
|---|---|---|---|---|
| DE | 102017125122 A1 * | 5/2019 | | |
| WO | WO-2007051049 A2 * | 5/2007 | | G06Q 50/12 |

* cited by examiner

*Primary Examiner* — Robert J Utama
(74) *Attorney, Agent, or Firm* — Workman Nydegger

(57) ABSTRACT

Techniques related to promoting consistent cooking event outcomes are disclosed. Natural language processing (NLP) is used to promote the consistent cooking event outcomes. Data is acquired from a sensor that is monitoring a cooking preparation area. Based on the data, an event is identified. The event is modeled using NLP, which then predicts a subsequent event that will likely occur in the cooking preparation area. NLP is also used to select a recipe. A list of instructions included in the selected recipe are displayed in a user interface.

17 Claims, 19 Drawing Sheets

INTELLIGENT COOKING PROCESS FLOW

CROSS-REFERENCE TO RELATED APPLICATIONS

This application claims priority to U.S. Provisional Application Ser. No. 63/221,392, filed on Jul. 13, 2021, and entitled "INTELLIGENT COOKING PROCESS FLOW," the entirety of which is incorporated herein by reference.

BACKGROUND

In cooking, a recipe is the collection of instructive steps by which successful cooking sessions are recorded for future food reproduction. These recipes are difficult to create and are often lacking in important details due to reliance on low resolution, and even subjective, textual terms to describe the activity to perform (e.g., sauté, stir, brown, etc.), as well as the time and temperature involved in the activity (e.g., medium-high heat, cook until translucent, until firm in the middle, etc.). Recipes can, therefore, be quite difficult to follow or recreate in a way that accurately represents the creator's intent.

Often, a recipe lacks significant and meaningful information that is required in order to reproduce the recipe. A recipe may call for "sauté over medium heat until golden brown." But what is meant by medium heat? When does the mixture reach "golden brown?" A professional chef with significant experience may intuitively understand the answers to these questions, but a so-called "home" chef may not. As a consequence, the finished "home" version of the product may be less than anticipated.

Similar difficulties arise with the preparation of food prior to cooking begins and even with the presentation of the food after it has been cooked. Indeed, home chefs are often at a loss as to how to properly prepare the food and how to present or "plate" that food. What is needed, therefore, is an improved process by which users are guided through the food preparation, cooking, and presentation actions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., wearable devices, hardware storage devices, etc.), and methods for promoting consistent cooking event outcomes.

In some embodiments, natural language processing is used to promote the consistent cooking event outcomes. For instance, some embodiments acquire data from one or more sensors that are monitoring a cooking preparation area (e.g., a user's own cooking preparation area or perhaps a different user's cooking preparation area). Based on the acquired data, one or more events are identified, where those events are ones that are occurring in the cooking preparation area. The embodiments model the events using natural language processing (NLP). The NLP is then used to predict one or more subsequent events that will likely occur in the cooking preparation area. Additionally, the NLP is used to select a recipe that is likely being followed in the cooking preparation area. The embodiments then display (e.g., within a user interface) a list of instructions included in the selected recipe.

In some embodiments, a user interface is structured to promote the consistent cooking event outcomes. For instance, some embodiments use a sensor to obtain data describing conditions associated with a cooking preparation area. Based on one or more events that are determined to be occurring in the cooking preparation area, the embodiments select a recipe for a user to follow. The embodiments also display a user interface. Notably, this user interface is configured to display a first user interface element representing a temperature gradient of the cooking preparation area. This gradient is generated based on the data obtained from the sensor. The user interface can also optionally display a second user interface element representing a temperature of a selected area that is selected from within an image representative of the cooking preparation area. The user interface can also optionally display a list of instructions that are included in the selected recipe. The user interface can also optionally display a video providing guidance on how to follow the list of instructions that are included in the selected recipe.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
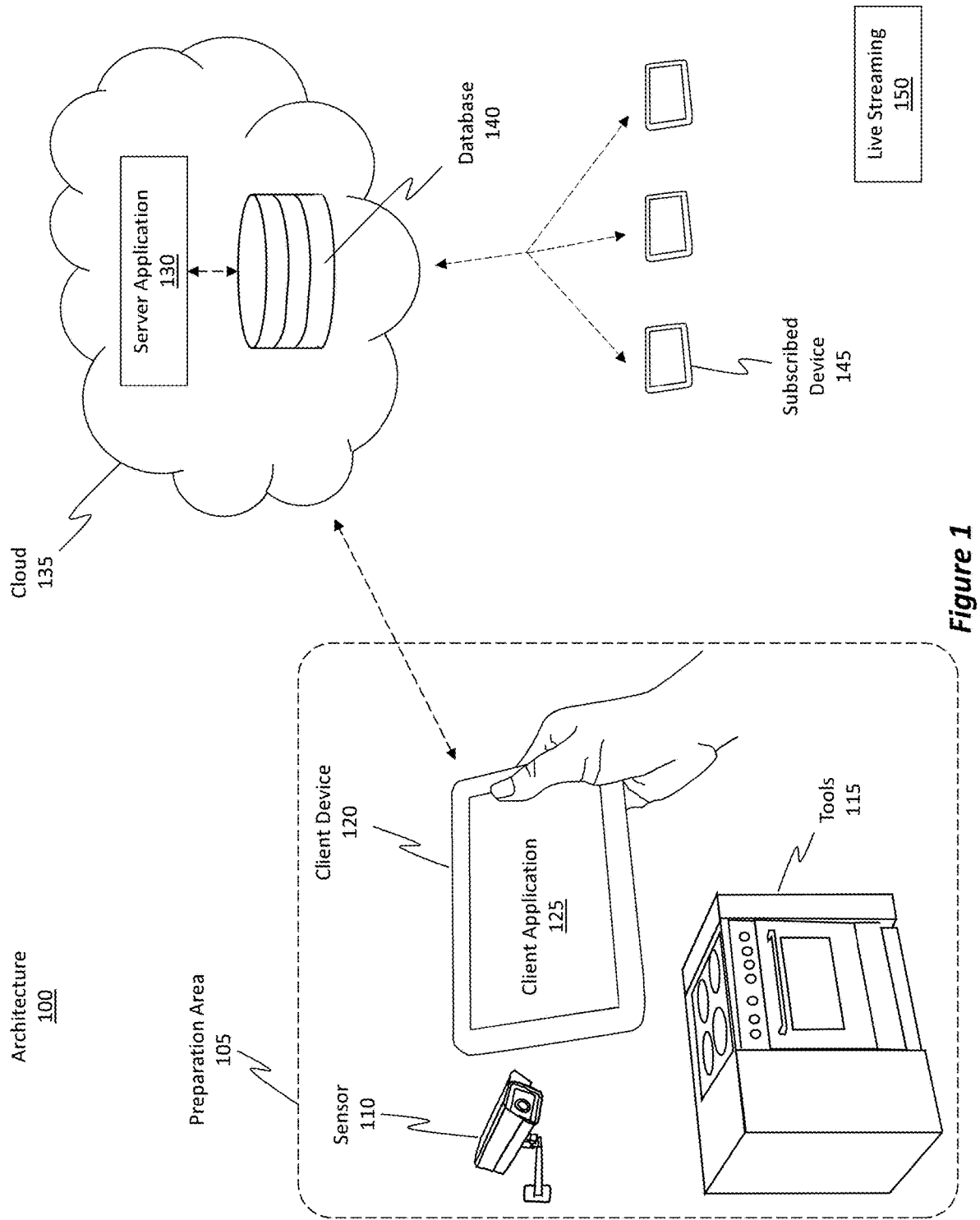
FIG. 1 illustrates an example architecture that can be used to facilitate the food preparation, cooking, and presentation actions disclosed herein.

Embodiments disclosed herein relate to systems, devices (e.g., wearable devices, hardware storage devices, etc.), and methods for promoting consistent cooking event outcomes.

In some embodiments, natural language processing (NLP) is used to promote the consistent cooking event outcomes. For instance, data can be acquired from a sensor that is monitoring a cooking preparation area. Based on the data, an event can be identified. The event is modeled using NLP, which then predicts a subsequent event that will likely occur in the cooking preparation area. NLP is also used to select a recipe. The embodiments display a list of instructions included in the selected recipe.

In some embodiments, a sensor obtains data describing conditions associated with a cooking preparation area. Based on a detected event, a recipe is selected. A user interface displays a first user interface element representing a temperature gradient of the cooking preparation area. This gradient is generated based on the data obtained from the sensor. The user interface can also optionally display a second user interface element representing a temperature of a selected area in the cooking preparation area. The user interface can also optionally display a list of instructions in the recipe. The user interface can also optionally display a video providing guidance on how to follow the instructions.

Examples of Technical Benefits, Improvements, and Practical Applications

The following section briefly outlines some example improvements and practical applications provided by the disclosed embodiments. It will be appreciated, however, that these are just examples only and that the embodiments described herein are not limited to only these improvements.

The disclosed embodiments beneficially promote consistent cooking event outcomes by providing a unique way of modeling cooking events using natural language processing (NLP). As will be described in more detail later, cooking events (which include cooking preparation events, actual cooking events, and even presentation or plating events) can be likened or analogized to language structure constructs, such as subjects, verbs, objects, and so on. These constructs can be modeled using NLP. Similar to how NLP can perform autocompletion when text is being typed (i.e. a form of predictive writing), the NLP can also be used to predict which next set of one or more preparation, cooking, or presentation events will be performed. By performing such operations, the embodiments help guide users in the preparation of food, the cooking of food, and even the presentation of food. By practicing such operations, users will be able to achieve consistency in those various events, thereby leading to an improved user experience with the computer system and thereby leading to a consistent outcome time and time again.

In this sense, techniques in which NLP is used are described herein, where those techniques are applied in a cooking context. In view of the fact that natural language processing (NLP) is used to facilitate the disclosed operations, one can view the disclosed operations not just as "natural language processing" but perhaps as "natural cooking processing" or perhaps "natural language cooking processing." Therefore, when reference is made to NLP throughout the remaining portions of this document, one should appreciate how such NLP operations are directly tied to the cooking operations such that use of NLP (as used herein) refers to techniques in which NLP is used in a cooking context.

The disclosed embodiments rely on NLP techniques in numerous different substantive areas in the cooking world, such as food preparation, food cooking, and even food plating. The embodiments also beneficially enable "live follow," which describes a scenario where a person is cooking in one area and other people are following (in real-time or "live") in a separate location via a network connection. This following ability also promotes or facilitates the ability for a "simultaneous cooking" experience, where a dish or meal is being prepared by multiple individuals at the same time in a collaborative manner. The embodiments also enable a "chef's note" or "voice of the chef" experience where the chef can add specific information that is presented at a specific time to an individual that is preparing a dish. The embodiments also beneficially enable the automatic generation of a promotional video in which a recording of a recipe is made and then a shortened version of the video is automatically generated. That shortened video demonstrates when and how ingredients were prepared or added in an effort to slow down the process and provide specific focus to the process. Thermal data can also be used in the promotional video. Additionally, the embodiments harness "recipe building blocks" that allow individuals to use pieces of a recipe to create new recipes. Each of these aspects will be discussed in more detail later.

The embodiments also bring about numerous other practical and real benefits to the technical field. For instance, by modeling cooking events using NLP, the embodiments are able to facilitate improved collaboration with other users, they are able to help provide safety alerts when certain potentially adverse events are likely to occur (e.g., water boiling over, detection of a minor about to touch a hot surface, etc.), and they are able to provide a useful user interface that is designed to guide users throughout all the various cooking activities.

By following the disclosed principles, users in their homes and other locations will be greatly benefitted. That is, they will be able to prepare, cook, and present food with ease, with a high degree of success, and with highly consistent outcomes. Cooking can be quite hard. The embodiments are able to help users navigate these difficult processes to a successful outcome. Through the use of different sensors (e.g., visible light cameras, thermal cameras, etc.), tools (e.g., artificial intelligence, computing interconnectivity), and intuitive user interfaces, the embodiments are able to help the various processes involved with being in a kitchen.

The embodiments also beneficially allow users to record their own recipes, to share those recipes, and/or to follow recipes generated by other users. The users can collaborate in real time as they are experiencing their cooking sessions. The sensor data can also be shared in real time. For example, a user can be following a cook, who is streaming a video to the user. The user can select his/her user interface at a particular location on the screen (which is showing the cook's preparation area) and can add a temperature pin. For instance, the user interface might be showing the cook's pan and a steak on that pan. The user can select the steak (or an area on the steak) and add a temperature pin for the steak. The temperature pin will then reflect the temperature of the steak at the cook's own cooking area (e.g., the cook can have his/her own set of sensors that are producing data, including temperature data, and that data can be shared with the user). In this regard, sensor data can be shared across different devices. The user can then have a better understanding of what his/her own steak should be cooking at (i.e. the temperature) because the user now knows what temperature the cook's steak is currently at in a real-time and dynamic manner.

As an additional benefit, because the sensor data from different users can be shared, one user (or a machine learning model) can determine how to modify certain actions based on differences in environmental conditions. As an example, one user might be located at sea level while another user might be located at an elevation of 7,000 feet. Cook temperatures and times can vary because of these differences in elevation. The embodiments are able to acquire sensor data from each of the different locations and then automatically modify certain actions in response to that acquired data (e.g., modify cook times or temperatures based on the elevation data). In doing so, the embodiments can facilitate consistency between the different locations using collaboration and sensor feedback data, despite conditions being different at those different locations. Accordingly, these and numerous other benefits will now be discussed in more detail throughout the remaining portions of this disclosure.

Example Architecture

Attention will now be directed to FIG. 1, which illustrates an example architecture 100 in which the disclosed principles may be practiced. Architecture 100 is shown as including a preparation area 105, which can include one or more sensors 110, one or more tools 115, and a client device 120 hosting a client application 125.

The one or more sensors 110 can include any type of sensor. Examples of sensors include, but are not limited to, any type of visible light camera, monochrome camera, thermal imaging camera, infrared camera, temperature sensor, humidity sensor, elevation sensor, barometric pressure sensor, and so on without limit. The sensor 110 is designed to collect data describing events or conditions that are occurring in the preparation area 105.

As an example, a camera can record a user preparing, cooking, and presenting food in the preparation area 105. As will be discussed in more detail later, a machine learning (ML) algorithm (which can include NLP) can be employed to analyze the video recording/stream and to identify the events or conditions occurring in the preparation area 105.

Any type of ML algorithm, model, machine learning, or neural network may be used to identify events occurring in an area. As used herein, reference to "machine learning" or to a ML model or to a "neural network" may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

The tools 115 can include any tool used in a cooking environment. Examples of tools 115 include, but are not limited to, stoves, ovens, refrigerators, knives, spoons, forks, mixers, bowls, fire extinguishers, and so forth without limit.

The client device 120 can be any type of handheld portable device. In some instance, the client device 120 can be a non-portable device, such as perhaps a television or computer mounted to a surface in the preparation area 105. The client device 120 can be a mobile smart phone, a desktop, a laptop, or even a tablet.

The client device 120 is able to execute or host a client application 125, which can communicate with a server application 130 operating in perhaps a cloud 135 environment. The server application 130 is able to host or at least communicate with a database 140. The database 140 can store and maintain information related to (i) the ML algorithm mentioned earlier, (ii) control of the sensor 110, (iii) the client application 125, or (iv) any other operation disclosed herein. The database 140 can also store recipes that are currently being created or that were previously created. In any event, the client application 125 and the server application 130 are able to communicate with one another in an effort to promote consistent cooking event outcomes, as will be described in more detail throughout this disclosure.

In some cases, the client application 125 can be used as a client-facing guide to instruct a user how to prepare, cook, and present food. In some cases, the client application 125 can be used to record a user while he/she generates a recipe and/or while he/she is instructing other users on details of a recipe. The client application 125 can also be used to simultaneously display a video received from another user (e.g., an instructor) and a video of the user him/herself. Additionally, the client application 125 can display sensor data obtained from sensors in the user's own preparation area as well as sensor data obtained from a different user's preparation area. In doing so, the user can readily identify differences in conditions that exist at his/her own preparation area and conditions that exist at another user's preparation area. As a quick example, the client application 125 can display in a juxtaposed manner the temperature data of a steak being prepared at the user's preparation area and the temperature data of a similar steak being prepared at an instructor's preparation area. More examples will be provided later.

As another example, the client device 120 and the sensor 110 can be used to generate content, and that content can then be transmitted over the network to any number of streaming or subscribed devices, as shown by subscribed device 145. The subscribed device 145 can be the device of another user who is following that original user, who is using the client device 120, in order to learn how to prepare, cook, and present certain meals. Any number of devices can be subscribed and can receive a stream. The stream can be a real-time stream (e.g., as shown by live streaming 150) or it can be a pre-generated and pre-recorded stream. The stream can include video content, image content, and/or sensor data.

Using NLP To Detect And Analyze Events

The server application 130 (or potentially even the client application 125) can be used to receive data and to analyze that data to determine which events or conditions are occurring in the preparation area 105. An example of an event or condition can be a user chopping onions. Another example of an event can include a user cooking bacon. Another example of an event can be a user placing meat onto a plate. Another example can be the detection of water boiling over a pan. Yet another event can include a child approaching a hot surface with the potential intention of touching the hot surface. Such events can be recorded using video, audio, and/or any type of sensor.

Figure 2:
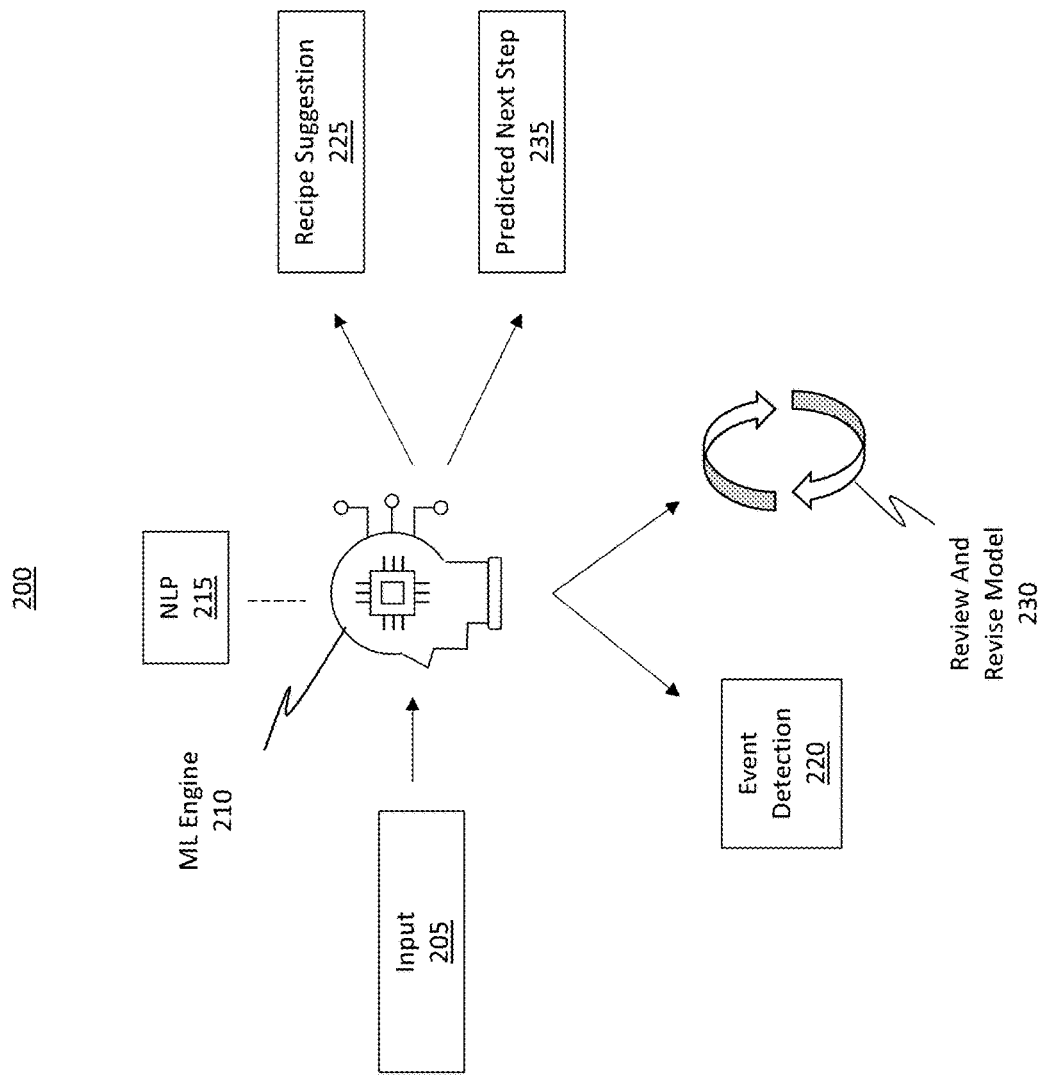
FIG. 2 illustrates how the steps involved in preparing, cooking, and presenting food can be modeled using a language model and using natural language processing.

In some embodiments, the data acquired using the sensor 110 can be fed as input into a machine learning (ML) algorithm to detect which events are occurring and even to predict which subsequent or future events might likely occur. As an example, a video stream where a user is chopping onions can be fed as input into the ML algorithm. The algorithm can then perform object segmentation and video analysis to determine that the user is chopping onions. As another example, a thermal data video stream where a pot retains boiling water can be fed as input into the ML algorithm. The algorithm can detect the temperature of the water. The algorithm can also detect instances where droplets of water erupt out of the pan onto the stove top. In this scenario, the algorithm can predict that the water will shortly begin to rapidly boil over the pan based on the current detected state of the water. FIG. 2 provides additional details.

FIG. 2 shows an example architecture 200 in which input 205 is fed into a ML engine 210. The input 205 can be the data generated by the sensor 110 from FIG. 1. For instance, such data can include video recordings (e.g., visible light videos, monochrome videos, thermal imaging videos, and so forth), images (e.g., visible light, monochrome, thermal, etc.), climate data (temperature, humidity, etc.), and so forth. The input 205 can also be data entered by a user using the client application 125.

The ML engine 210 can be any type of ML engine, as mentioned previously. In preferred embodiments, the ML engine 210 at least includes natural language processing NLP 215. The NLP 215 is able to review and analyze the input 205 to perform event detection 220. To be clear, the NLP 215 is able to review and analyze not only text-based input, but it is also able to review and analyze image data, video data, audio data, and any other type of sensor data (e.g., temperature, humidity, etc.).

For instance, the NLP 215 is able to utilize any type of optical character recognition (OCR) to identify and determine text that is recognizable. The NLP 215 is also able to perform word segmentation (often called tokenization) in order to separate bodies of text into different words. The NLP 215 is also able to perform a morphological analysis on text, such as by performing morphological segmentation or even part-of-speech tagging. The NLP 215 is also able to perform syntactic analysis to identify the underlying syntax of words describing the item. By way of example, the NLP 215 can perform both dependency parsing (i.e. identifying relationships between words in a sentence) and constituency parsing (i.e. generating a parse tree based on the relationship between the words). The NLP 215 can also perform any type of lexical semantics, distributional semantics, named entity recognition, sentiment analysis, terminology extraction, and even word sense disambiguation.

In addition to the above functionalities, the NLP 215 can also analyze images, videos, and any type of sensor data and can perform object segmentation and recognition in order to detect events or conditions in that data. The NLP 215 can also analyze audio data, such as by transcribing speech into text. Regardless of the type of input, the NLP 215 is able to detect events (e.g., event detection 220) that are occurring in the preparation area. An example will be helpful.

Suppose a user is collecting a set of ingredients (e.g., carrots, potatoes, chicken broth, and bacon). The NLP 215 is able to communicate with the sensors (e.g., perhaps a camera) in the preparation area to record images, videos, or any other sensor data. The NLP 215 can analyze the data to detect the various ingredients and the user's interaction with those ingredients (e.g., placement on a chopping board, placement in a frying pan, chopping actions, etc.), as shown by event detection 220. Based on the determined or inferred conditions/events, the NLP 215 can determine that the user is potentially going to make a soup. That is, the NLP 215 can predict, suggest, or propose a recipe the user is going to follow and/or use (based on the detected ingredients), as shown by recipe suggestion 225.

Suppose further the user is chopping a clove of garlic. Initially, based on the clove's shape, it may be the case that the NLP 215 incorrectly determines the clove is a sliced and peeled lemon. The NLP 215 is able to continually or periodically review and revise its determinations in an effort to ensure it has correctly identified the various ingredients. For instance, as shown by the review and revise model 230, the NLP 215 is able to re-analyze the sensor data to ensure its predictions or determinations are correct.

As an example, suppose during a first image capture, the glove of garlic was incorrectly identified as a lemon slice. Later, the NLP 215 can trigger the generation of another image or video and can perform another object segmentation process. In this later image, it may be the case that the garlic clove is shown in a clearer perspective. Based on this updated perspective, the NLP 215 can revise its initial determination and correctly identify the clove for what it is. Additionally, based on the updated information, the NLP 215 can revise whatever recommendations it previous provided and/or revise its confidence levels in those recommendations.

To illustrate, with the updated information, the NLP 215 can determine whether or not to reconsider or revise the suggestion of a particular recipe. Additionally, or alternatively, the NLP 215 can modify a so-called "confidence" that it relied on when previously presenting a recipe. As an example, suppose the NLP 215 suggested a soup recipe based on the detected ingredients, despite the NLP 215 incorrectly identifying a lemon slice. In that initial case, the confidence the NLP 215 had in its selection may have been 55%, where the 55% indicates that the NLP 215 was 55% confident that the user was preparing a soup. Here, the confidence was lower because of the inclusion of a lemon, which ordinarily might not be included in a soup with potatoes, carrots, and bacon. After correctly identifying the garlic clove, the NLP 215 can revise its confidence to a higher value, such as perhaps 80% or more than 80%, where the 80% indicates that the NLP 215 is 80% confident that the user is preparing a soup.

In addition to suggesting a recipe, the NLP 215 can also predict one or more next steps or actions that the user will likely perform, as shown by predicted next step 235. For example, based on the detected ingredients and optionally based on the suggested recipe, the NLP 215 might determine that the user will subsequently cook the bacon or peel the potatoes. Such steps can be provided as prompts to the user in the form of the predicted next step 235. As more data is collected using the sensors, the NLP 215 can continually or periodically review and revise its determinations in an effort to generate improved predictions.

Modeling Events As A Language Structure

In addition to the above processes, the NLP 215 can also model the detected events as syntax or grammar objects in a language model/construct. That is, when a user is preparing food, that user often follows a particular set of steps or actions that routinely tend to occur. To illustrate, in cooking, there is often a preparation stage, a cooking stage, and a presentation stage. Within each one of those stages, there are sub-stages. For example, the preparation stage often includes gathering a set of ingredients, cleaning those ingredients, chopping those ingredients, and so on.

Based on the frequency by which these steps are performed, the entire experience can be modeled as if it were a language (e.g., subject, verb, object, etc.), and those steps or events can be applied in the domain of natural language processing, thereby enabling the embodiments to assist in the ease of the process going from start to finish. By modeling the processes as if they were constructs in a language (e.g., subject, verb, object, etc.), then the embodiments are able to predict what the next step should be, similar to how autocompletion works in the realm of text input.

It should be noted that the events can be performed in an asynchronous manner while still being modeled using a language construct. That is, it is not required for one specific step to be performed, then another specific step, then another. Instead, the steps can be performed out of order relative to one another, or even no order whatsoever or even simultaneously with one another. The NLP 215 is able to detect the various "steps" or "events" (e.g., peeling potatoes, cooking bacon, etc.) and can consider the combination of those events as a whole without requiring any particular ordering of those events. In this sense, the "sentence" language structure of the detected events can be built on-the-fly, not necessarily dependent on an order of detection. Another example will be helpful.

Suppose a user is not following a recipe but rather is creating on-the-fly. The embodiments have the ability to utilize the elements of natural language processing to analyze the events occurring in the preparation area. For example, when a user is cooking ingredients, it is almost always the case that the first thing the user does is start with a pan and heats it up for some amount of time. The user then tends to put in butter or oil or some type of fat to grease the pan. The user then puts in a protein or a vegetable.

Based on the above description, one can appreciate how there is often a known sequence or ordering of events that are common to the preparation, cooking, and presentation processes (even if those events are not in a strict ordering). For instance, if a user starts with a pan, then the NLP 215 can use sensors to detect that pan and can predict a subsequent event that will likely occur, such as greasing or buttering the pan.

It may be the case that the NLP 215 determines an action is occurring, but the NLP 215 might not be able to explicitly identify what that action is. For example, a user might put butter on a pan, but for whatever reason the NLP 215 was not able to detect or identify the butter. Based on the inferred operations, even if the butter is not clearly recognizable in an image, the NLP 215 can infer, based on the general sequence of events, that the user likely used butter to grease the pan, as opposed to placing some other substance on the pan (e.g., it is highly unlikely the substance placed on the pan was a fruit). The notion of understanding on the part of the NLP 215 is that the substance is likely going to be butter of some kind, and that notion can be built into the concept where the detected events are in the world of recipe preparation, cooking, and presentation.

In this sense, there is a sequence, and that sequence can be likened to a grammar and syntax language structure and thus can be structured as a language model. That is, the embodiments are able to create a language model for recipe preparation, creation, following, and presentation so that when a user is going through different stages in the cooking process (e.g., a preparation stage, a cooking stage, or a presentation stage), it becomes easier for the system to assist the user because the system can predict what the user is going to do and can provide recommendations based on those inferences/predictions.

In this sense, the embodiments are able to apply NLP, where the embodiments effectively treat the detected events as input to the NLP, and the NLP generates output in the form of predicted next steps. Notably, the NLP processes can be applied to a food preparation process, a food cooking process, and even to a food presentation process. Indeed, NLP can be applied to any process related to food. The NLP can, therefore, perform predictive completion regarding the steps or events that are to be performed, similar to how text has an "auto-complete" function that generates next text based on existing text.

Figure 3:
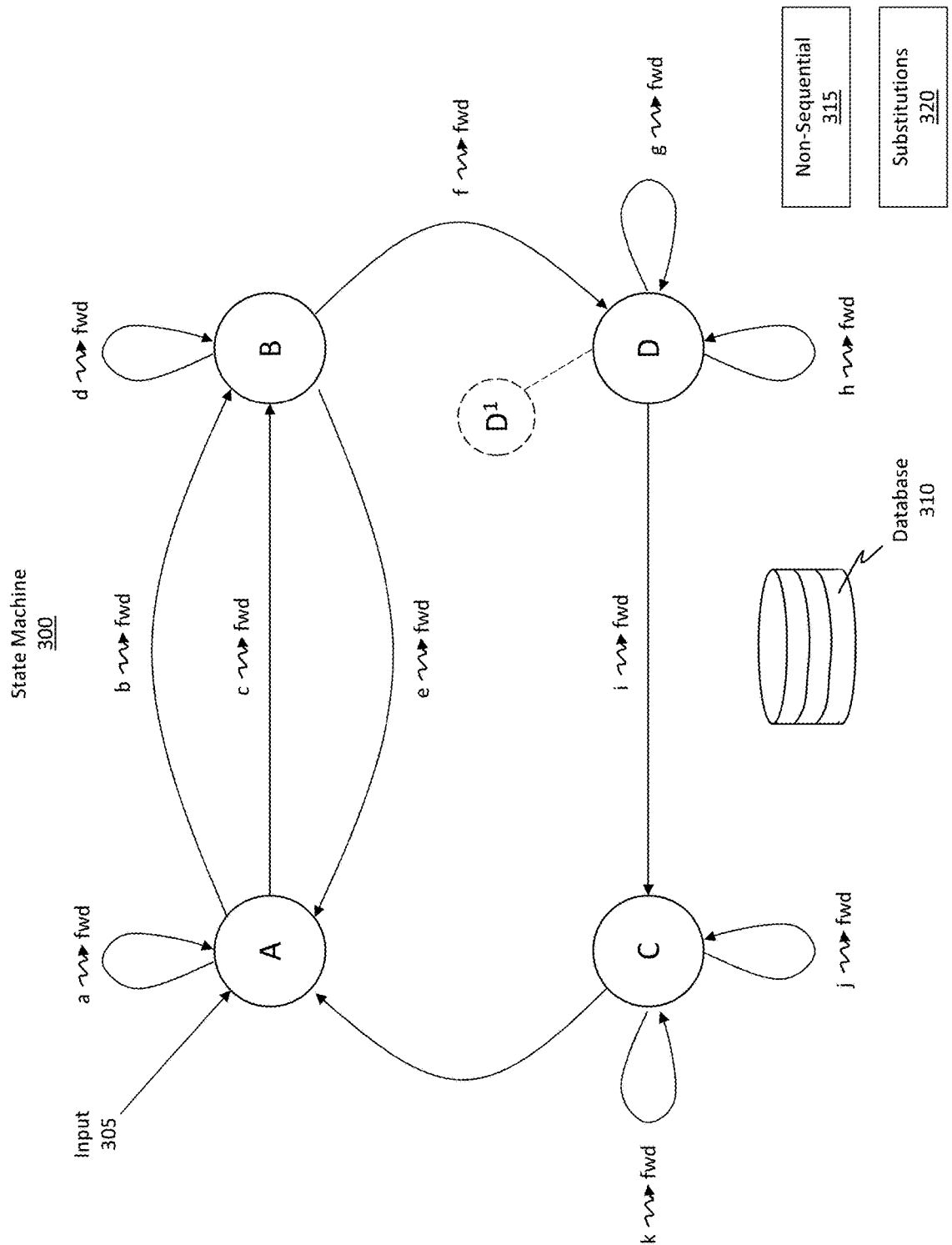
FIG. 3 illustrates an example of a state machine that can be generated when modeling the actions involved with food preparation, cooking, and presentation.

Some embodiments, in order to perform the predictive operations, generate a predictive state machine, as shown by the state machine 300 of FIG. 3. The state machine 300 can be a predictive state machine model that predicts the next step or steps based on the current status of what is already available or already known.

For instance, input 305 is provided into the state machine 300. The input 305 is representative of the input 205 from FIG. 2. As an example, the input 305 can be a detected event where a user is observed collecting a particular ingredient. The NLP 215 is able to analyze the input to detect events. The NLP 215 is also able to generate the state machine 300, which can track or determine which next step or event will occur based on what has already occurred.

To illustrate, as a result of receiving input 305, the state "A" in the state machine 300 is triggered or instantiated. State "A" can be likened to a user placing a pan on top of a stove's burner. The NLP can predict that the user is likely going to add butter or some other fat in order to grease the pan. State "B" can be representative of that event. The state machine 300 can have any number of additional states. Transitioning from one state to another can be dependent on detected events occurring in the preparation area. For instance, in response to detecting event "b," the state machine 300 will transition from state "A" to state "B." In response to detecting event "f," the state machine 300 will transition from state "B" to state "D." The state machine 300 can grow at any rate and can include any number of nodes or states. The predictive capability of the NLP can also increase as more information is obtained and as more events are detected.

The state machine 300 can be stored in a database 310. The NLP can also add to the state machine 300 based on existing information stored in the database 310. For instance, the database 310 can include any number of recipes and ingredients. The NLP can query or rely on the information in the database 310 in order to add to the state machine 300 and in order to make predictions.

Some embodiments are able to add some predicted states to the state machine 300. That is, the NLP is able to identify and learn which states have already occurred. Based on that baseline understanding, the NLP can then intelligently add states to the state machine 300, where those states are not ones that have already occurred but are states that are predicted will occur based on past knowledge or based on existing states already included in the state machine 300.

As discussed previously, there is not a need for events to be performed in a sequential or chronological order in order for the NLP to make predictions. In this sense, the detected events can be identified in a non-sequential 315 manner.

In some cases, users might substitute one ingredient for another or might substitute one process for another. For instance, instead of butter to grease a pan, a user might use coconut oil to grease the pan. The embodiments are able to detect and recognize such substitutions, as shown by substitutions 320. As another example, state "D" might be "chopped onions." In some cases, a user might substitute "chopped onions" in state "D" with a different ingredient, such as perhaps "chopped cloves" in state "D'." FIGS. 4A, 4B, 5A, and 5B shows some additional information that will supplement the above discussion.

Event Sequences

Figure 4A:
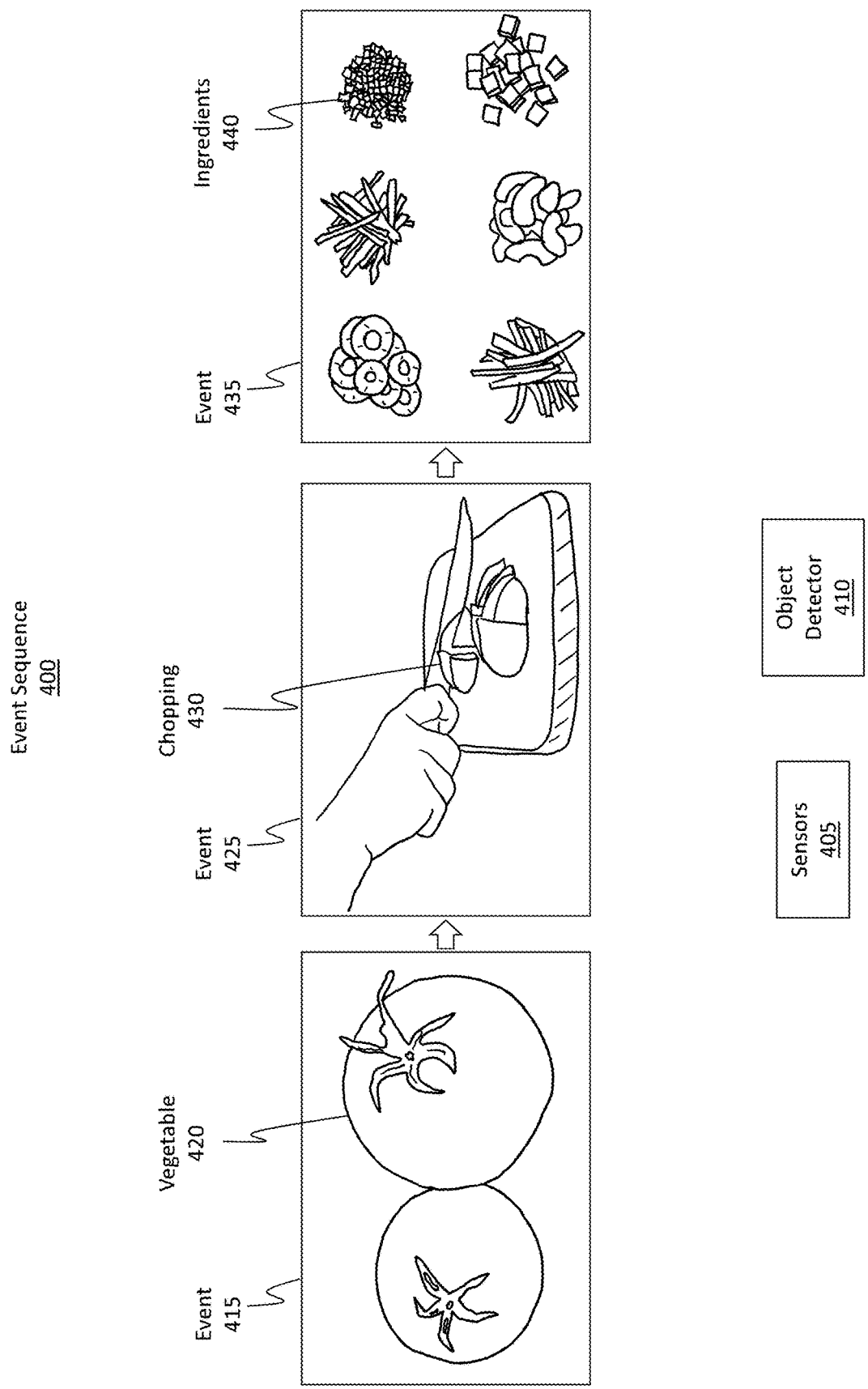
FIGS. 4A and 4B illustrate examples of preparation steps and how next steps can be predicted using the natural language processing.
Figure 4B:
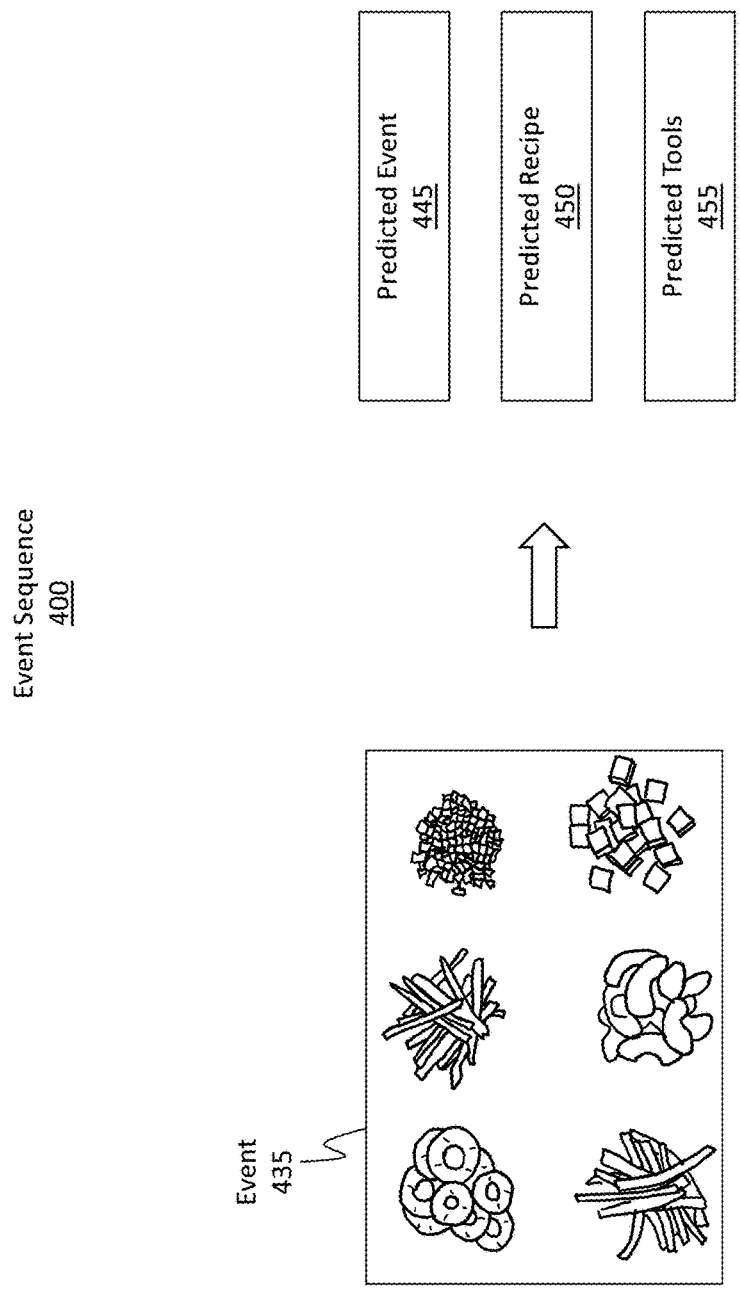

FIGS. 4A and 4B show an event sequence 400 comprising one or more events that are detected from images, videos, audio recordings, or any other type of sensor data, which will be generally referred to as "data." To capture or generate that data, the embodiments rely on one or more sensors 405, as described previously. Additionally, the embodiments can harness or utilize an event or object detector 410, such as the ML engine or the NLP mentioned previously.

FIG. 4A shows an image of an event 415 where a vegetable 420 is being brought to a preparation area. Another image shows an event 425 where that vegetable is being chopped, as shown by chopping 430. Yet another image shows an event 435 in which multiple ingredients 440 are assembled or brought together in a preparation area.

FIG. 4B again shows the image of the event 435. In this scenario, the NLP has analyzed the various events embodied within the images (or video or audio or sensor data). Based on the detected events, the NLP can model those events as a language construct and can then predict what set of one or more events will likely come next in the process. For instance, the NLP can generate a predicted event 445 (e.g., the user will likely chop another specific ingredient or begin cooking a particular ingredient) or can generate a predicted recipe 450 (e.g., based on the detected ingredients, the NLP can predict the user is following a particular recipe, which can be stored in a database) or can even generate a set of predicted tools 455 (e.g., the NLP can predict the user will need a mixer or a pan or a spatula) that will likely be needed to complete the predicted processes. For example, the NLP can add the predicted event 445 as a new state in the state machine 300 of FIG. 3, and the NLP can make connections or links between the new state and any existing states in the state machine 300.

Figure 5A:
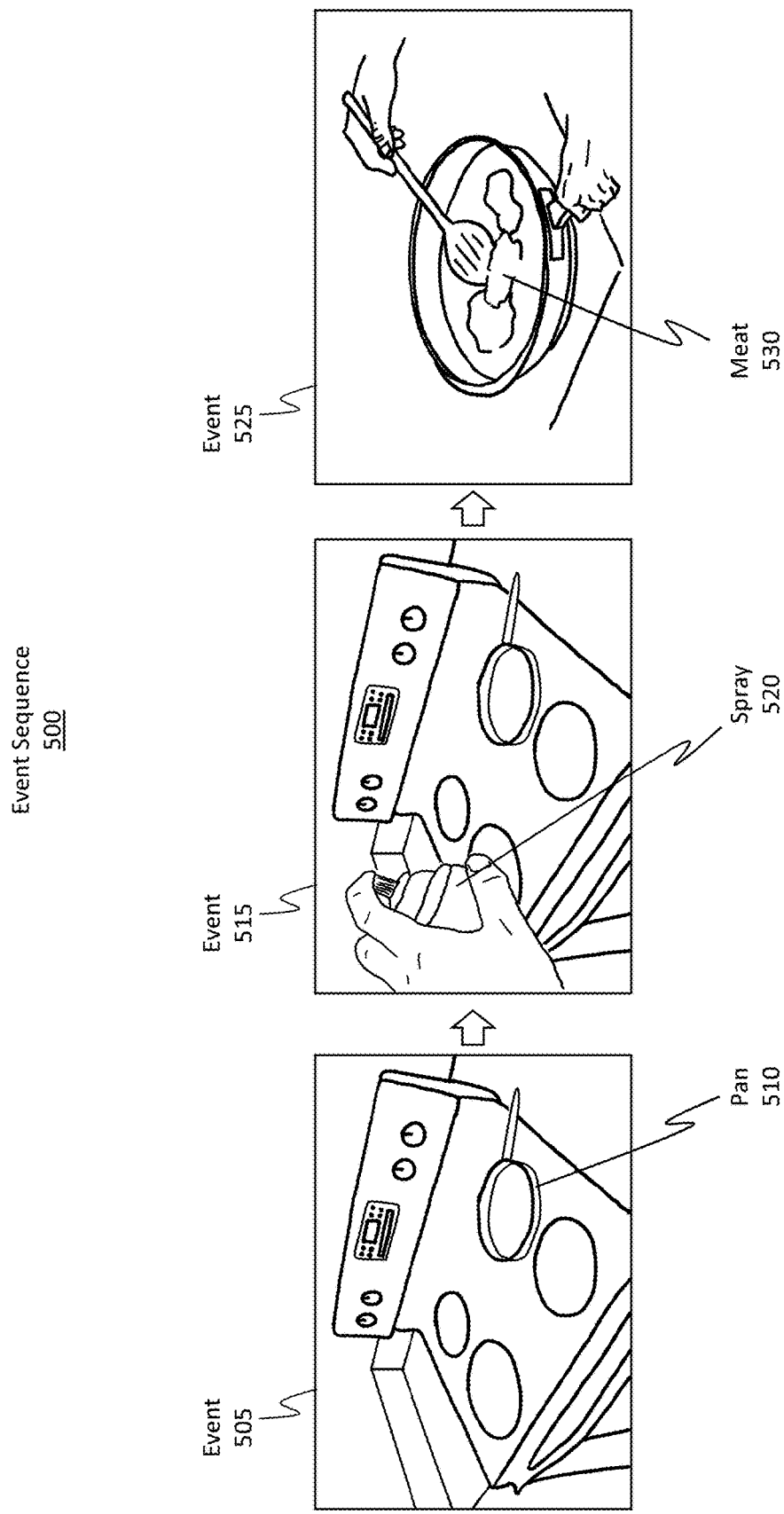
FIGS. 5A and 5B illustrate examples of cooking steps and how next steps can be generated using the natural language processing.
Figure 5B:
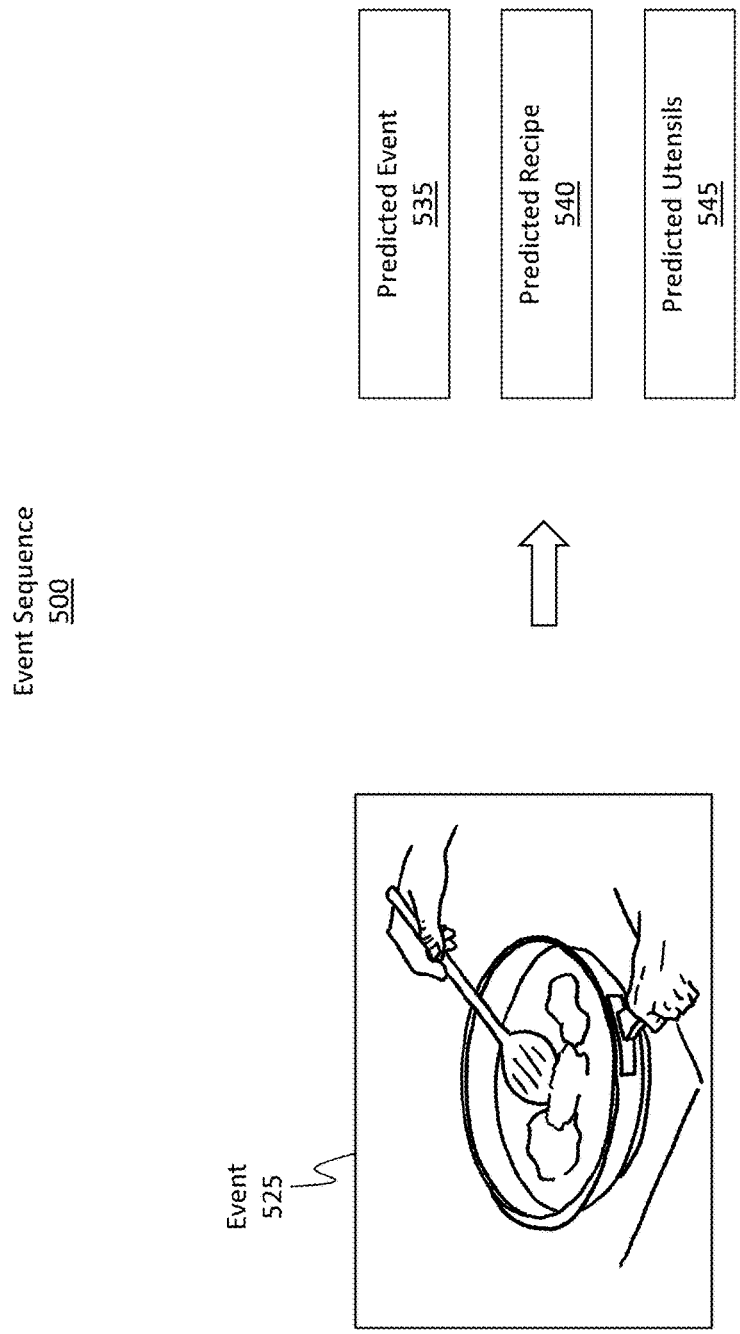

FIGS. 5A and 5B show another example of an event sequence 500. To illustrate, FIG. 5A shows an image of an event 505 in which a pan 510 is placed on a stovetop. The next image captures an event 515 where a user is spraying the pan, as shown by spray 520. The next image captures an event 525 where a user is cooking meat 530. In FIG. 5B, based on the detected event 525, the NLP can predict a next predicted event 535, a predicted recipe 540, and/or a set of predicted utensils 545 or tools. Accordingly, the NLP can receive input, analyze that input, and generate one or more suggestions or predictions on how the user is likely to proceed. Furthermore, the predicted event 535 can be added as a new state in the state machine 300 of FIG. 3.

Figure 6:
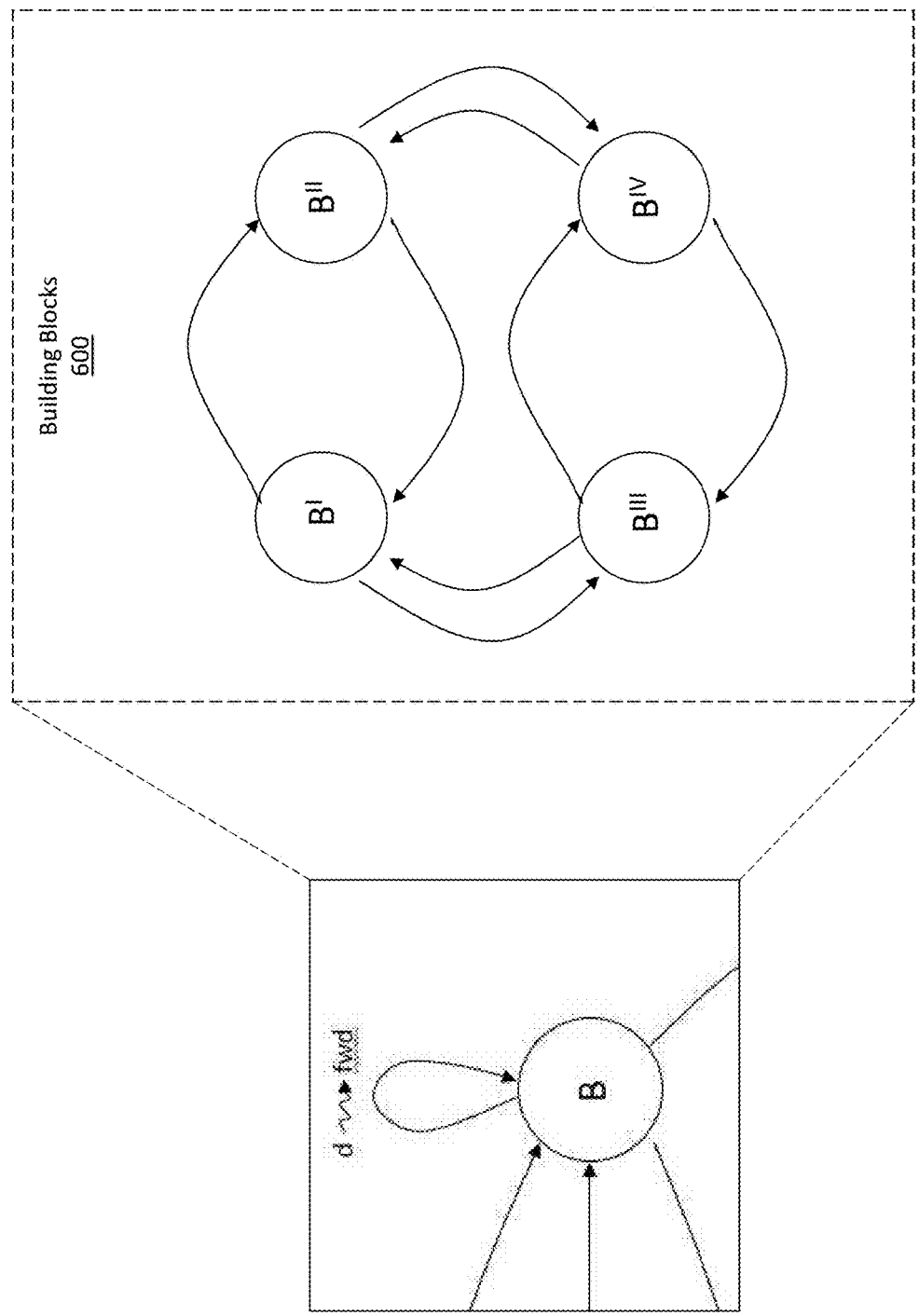
FIG. 6 illustrates how certain states in a state machine can be comprised of more granular sub-steps or building blocks.

FIG. 3 previously mentioned how the embodiments are able to generate a state machine 300, which can be used to build up different states in a recipe and which can be used to predict some states that might occur. In some embodiments, a particular state (e.g., perhaps state "B" as shown in FIG. 6) might be comprised of one or more sub-states or building blocks 600. For example, the state "B" in FIG. 6 is actually comprised of states "$B^I$," "$B^{II}$," "$B^{III}$," and "$B^{IV}$." An example will be helpful.

Suppose state "B" refers to mashed potatoes. In order to achieve that state, a number of building blocks 600 or sub-steps would have had to be performed. For instance, a potato would have to be cleaned, peeled, boiled, and then mashed in order to make mashed potatoes. The states "$B^I$," "$B^{II}$," "$B^{III}$," and "$B^{IV}$" could represent those sub-steps that are performed in order to achieve state "B." That is, any individual state may actually include a set of finer or more granular sub-steps.

Additionally, one state can replace another state in a sort of plug-and-play manner, as generally discussed before (e.g., alternative states or substitutions 320 in FIG. 3). Such plug-and-play states can be replaced with other states having any number of building blocks 600. Accordingly, different levels or hierarchies can exist in a state machine generated by the NLP.

Example User Interfaces

Figure 7:
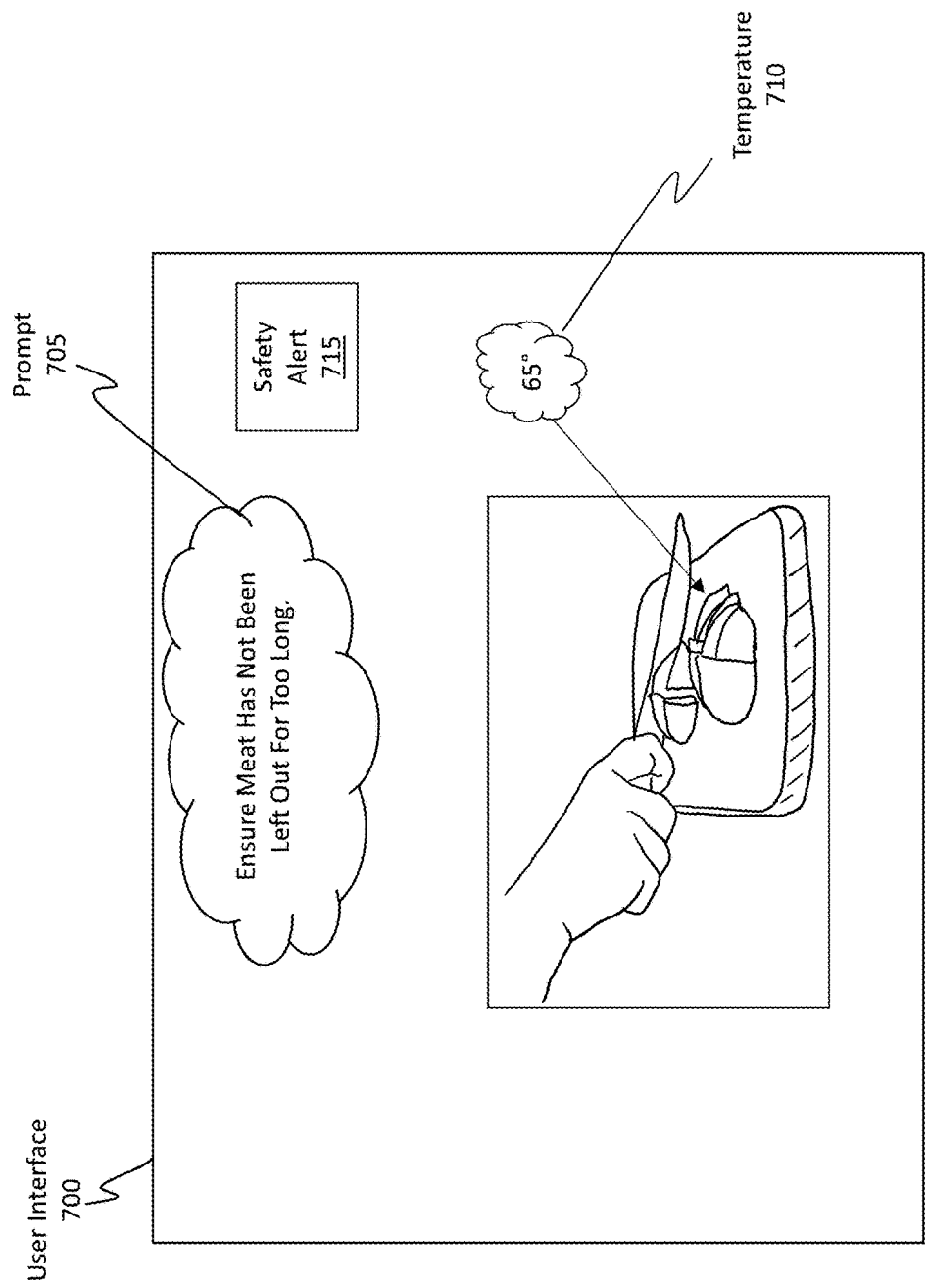
FIG. 7 illustrates an example user interface designed to have a layout in which supplemental data can be added to the user interface to further improve the user's interaction with the computer system.

The disclosed embodiments are able to guide users in a variety of ways and using a variety of techniques. For instance, the embodiments can generate a user interface designed to present information visually and auditorily. Furthermore, this user interface can be an enhanced interface that is structured to augment or supplement video or image data with additional data obtained from one or more sensors. Different color coding schemes can be used when presenting information, where the colors used can represent different types of information. As an example, a prompt displayed in a bright red color might be designed to readily capture the user's attention because of an impending dangerous condition. A prompt displayed in a soft blue color might be displayed as an instructional step. Indeed, any type of color coding scheme or visual emphasis can be used to relay different types of information. FIG. 7 is illustrative.

FIG. 7 shows an example user interface 700 that is currently displaying a prompt 705 providing a pro-tip or instruction on how to prepare a set of ingredients. In addition to this visual indicator, the prompt 705 can also be played using an audio recording, either live or pre-recorded. Additionally, the image or video can be supplemented with data acquired from one or more of the sensors mentioned previously.

To illustrate, the user interface 700 shows a temperature 710 for a particular area embodied within the image. In particular, the temperature 710 has an arrow or directional indicator pointed to the meat that is currently on display. The prompt 705 is informing the user that he/she should not leave the meat out for too long. The temperature 710 shows that the temperature of the meat is nearing room temperature. The temperature 710 can be acquired using a thermal imaging camera that is pointed at the area where the meat is being prepared. The embodiments are then able to supplement the image with this sensor data to provide an enhanced illustration for instructing the user on how to proceed with the preparation steps.

In some cases, the embodiments can also display one or more safety alerts, as shown by safety alert 715. For example, if a pan of boiling water is about to boil over, as detected by an observing camera (e.g., water droplets are erupting out of the pan), then the embodiments can trigger the display of an alert and/or trigger an auditory alert to alert the user of an impending safety hazard. In some cases, the embodiments can instruct the user on how to respond to the safety hazard. For instance, if an oil fire is detected, the embodiments can instruct the user to use baking soda to put out the oil fire. Indeed, any type of safety alert for any type of potential hazard can be provided to the user, using both a visual alert and an auditory alert.

In some embodiments, as will be discussed in more detail later, a user can select a part of an image or video, and the embodiments can display sensor data for that specific selected area. For instance, the user can manually touch the screen at the area where the meat is displayed to see what the current temperature of the meat is. In a scenario where observers are following a cook and are trying to follow the steps provided by the cook in real-time, those users can select the visualization of the cook's cooking area on their own screens to discern what temperature the cook's meat is currently at, either on the preparation board or on the stovetop (or any other area). In this regard, the embodiments facilitate collaboration between any number of users, whether in real-time or in a pre-recorded scenario. Sensor data between those users can also be shared.

Figure 8:
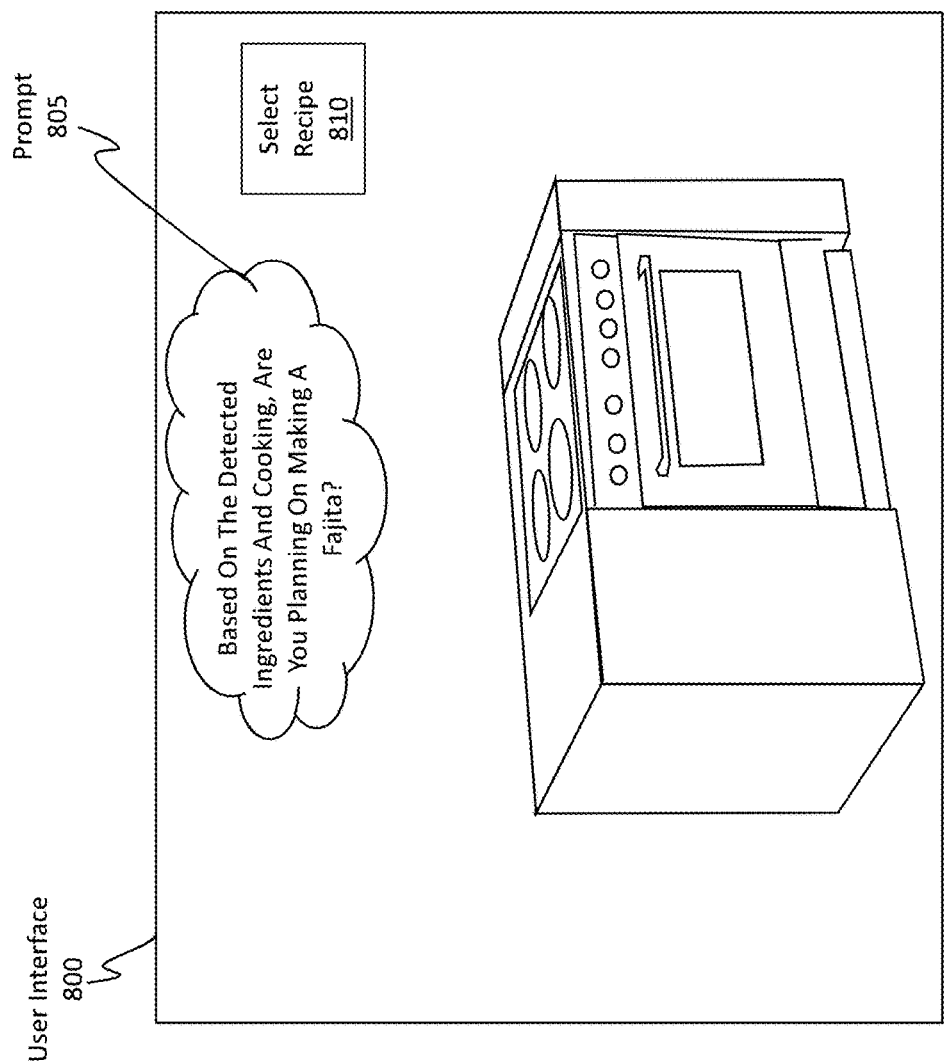
FIG. 8 illustrates another example user interface, where this interface is designed to surface or display customized prompts.

FIG. 8 shows another example user interface 800. Based on one or more events that are detected within the preparation area, the NLP is able to generate a prompt 805 asking the user whether he/she is following a particular recipe. For instance, the NLP is able to detect which ingredients the user is compiling and/or preparing. Based on those identified ingredients, which are identified using object segmentation and machine learning, the NLP can query the database of recipes to determine which recipes use one or more of those same ingredients. The NLP can then stack rack whichever recipes include one or more of those ingredients and assign a probability metric to each recipe. The probability metric can be based on the user's past performance of recipes, frequency of use by the user or other users, popularity, recipes that are currently trending in social media or other platforms, and so on.

As an example, suppose the NLP determines that three recipes include the ingredients that have been detected in the user's preparation area. The NLP is able to track and maintain which recipes the user has previously performed. The NLP is also able to query the Internet to determine whether a certain recipe is trending or is popular on the Internet. In this example case, suppose one of the three recipes has never been performed by the user. A second one of the three has been performed every Friday evening. A third one of the three is currently highly popular on a number of cooking websites or platforms. Currently, the time when the user is preparing the ingredients is a Friday evening.

Based on the collected information regarding the different recipes, the NLP can assign a probability to each recipe. In this example case, the NLP might assign a likelihood that the user is following the second recipe at about a 90% likelihood (e.g., perhaps because that recipe has been followed most Friday evenings, and it is currently a Friday evening). The NLP might assign a likelihood that the user is following the third recipe at about a 9% likelihood. The NLP might also assign a likelihood that the user is following the first recipe at about a 1% likelihood.

In response to assigning probability values to the identified set of recipes, the NLP can then display or surface one or more of those recipes, as shown by the select recipe 810 option. For instance, the NLP might select the highest ranked (i.e. the one most likely being performed) recipe and display it (or perhaps a thumbnail version or a hyperlink or perhaps a selectable title of the recipe) on the user interface 800 along with the prompt 805. If the user does want to follow that recipe, then the user can select the select recipe 810 option.

In some cases, the NLP might display the top "x" number (e.g., perhaps 2 or 3) of recipes that are candidates as to what the user is making. For instance, if two recipes have a similar probability or likelihood of being followed, then the NLP can modify the prompt 805 and the select recipe 810 to ask the user which recipe he/she is following. Again, a title, hyperlink, or selectable element can be displayed in the user interface 800 for each of the candidate recipes to allow the user to make a selection.

In some cases, when a recipe is being suggested by the NLP, the NLP can display the list of ingredients in the recipe. The NLP can then highlight or bold the set of ingredients that have been detected in the user's preparation area. In doing so, the user can understand why the NLP is suggesting a particular recipe (e.g., the NLP correlated the detected ingredients with the ingredients in the proposed recipe). That is, the suggestion occurred as a result of the recipe including the identified ingredients in the user's preparation area, and those specific ingredients can be emphasized, highlighted, or bolded within the list of ingredients in the displayed recipe.

Of course, the principles are not limited to following a recipe; rather, the principles can be more broad and can apply to any type of instructions. As an example, instead of displaying a recipe, the NLP might display a set of instructions on how to present or "plate" food on a serving platter or plate after the food has been prepared. Indeed, there is an art to food presentation, and the NLP can provide a set of instructions on how to present the food. Additionally, the instructions can include details on how to chop, slice, mix, or otherwise prepare food prior to cooking it. The embodiments can review chopping techniques used by a user and can provide an instruction video on how to improve his/her chopping technique if the technique is not correct. Accordingly, any set of instructions, whether they be for food preparation, food cooking, or food presentation, can be presented on the user interface 800 by the NLP or machine learning engine/algorithm.

Figure 9:
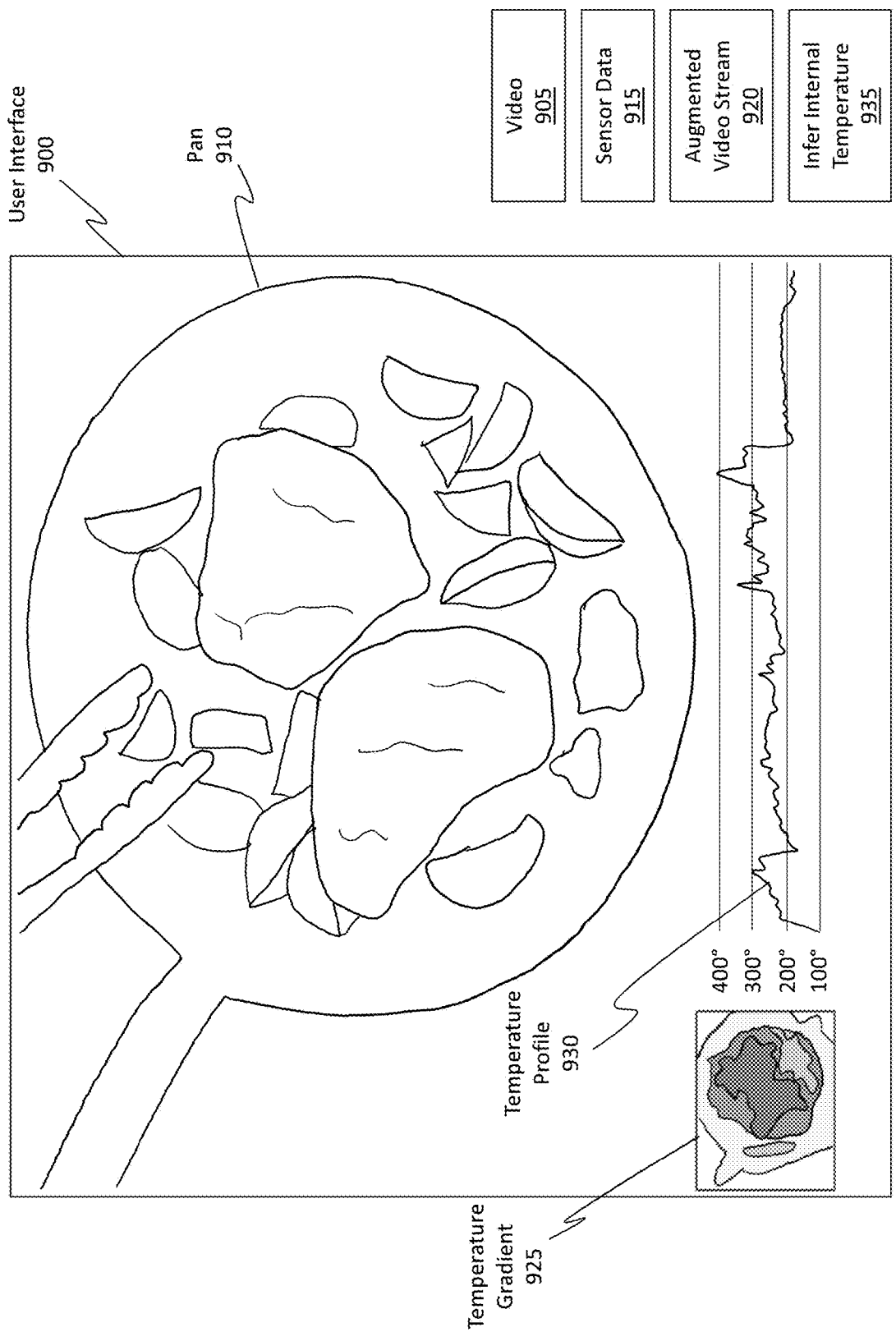
FIG. 9 illustrates another example user interface, where this interface is designed to display supplemental sensor data in combination with the playback of audio and video data.

FIG. 9 shows another example user interface 900 that is displaying a video 905. Here, this video 905 shows a pan 910 with food products in it. The embodiments are able to acquire sensor data 915 describing various conditions occurring at the pan 910. For instance, the sensor data 915 can include a visible light video stream, thermal imaging data, climate conditions of the preparation area, and so on. The embodiments are able to attach or append the sensor data 915 to the video 905 in order to create an augmented video stream 920.

To illustrate, the user interface 900 not only includes a video recording of the pan 910, but it also shows a temperature gradient 925 of the pan 910 (as generated by a thermal imaging camera), and a temperature profile 930, which indicates the temperature of the pan 910 over a determined period of time. Notice, with the temperature gradient 925, different areas of the pan 910 are hotter or cooler than other areas, as evidenced by the various gray tones. Relatedly, one can observe the differences in temperature over time by observing the peaks and valleys in the graphed plot represented by the temperature provide 930.

In some embodiments, the temperature profile 930 reflects the overall average temperature of the pan 910 (or whatever object the sensor is directed towards). In some embodiments, a user can select a specific portion of the pan 910 in order to monitor the temperature for that portion or area. As an example, a user can select the center-most area of the pan 910 and then display the temperature profile over time for that selected area.

In some cases, the user interface 900 allows a user to set temperature alerts if the temperature exceeds a particular threshold. For instance, a user can specify that if the temperature exceeds 300 degrees, then an alert should be triggered, where the alert can be a visual alert, an audio alert, or a visual and audio alert.

Unless an insertable temperature probe (which is inserted into a food product) is used as one of the sensors, then it is often the case that a user might not know what the internal temperature of a food product is. That being said, however, the embodiments are configured to be able to infer internal temperature 935 based on (i) the temperature that is observable, (ii) properties of the food product (e.g., its thickness, consistency, etc.), and/or (iii) how long the heat or temperature has been applied to the food product. Based on those various factors, the embodiments can predict or derive what the internal temperature of a food product is, and the embodiments can display an indication of the computed or estimated internal temperature along with an indication that the temperature is a "predicted internal temperature" of the food product.

Figure 10:
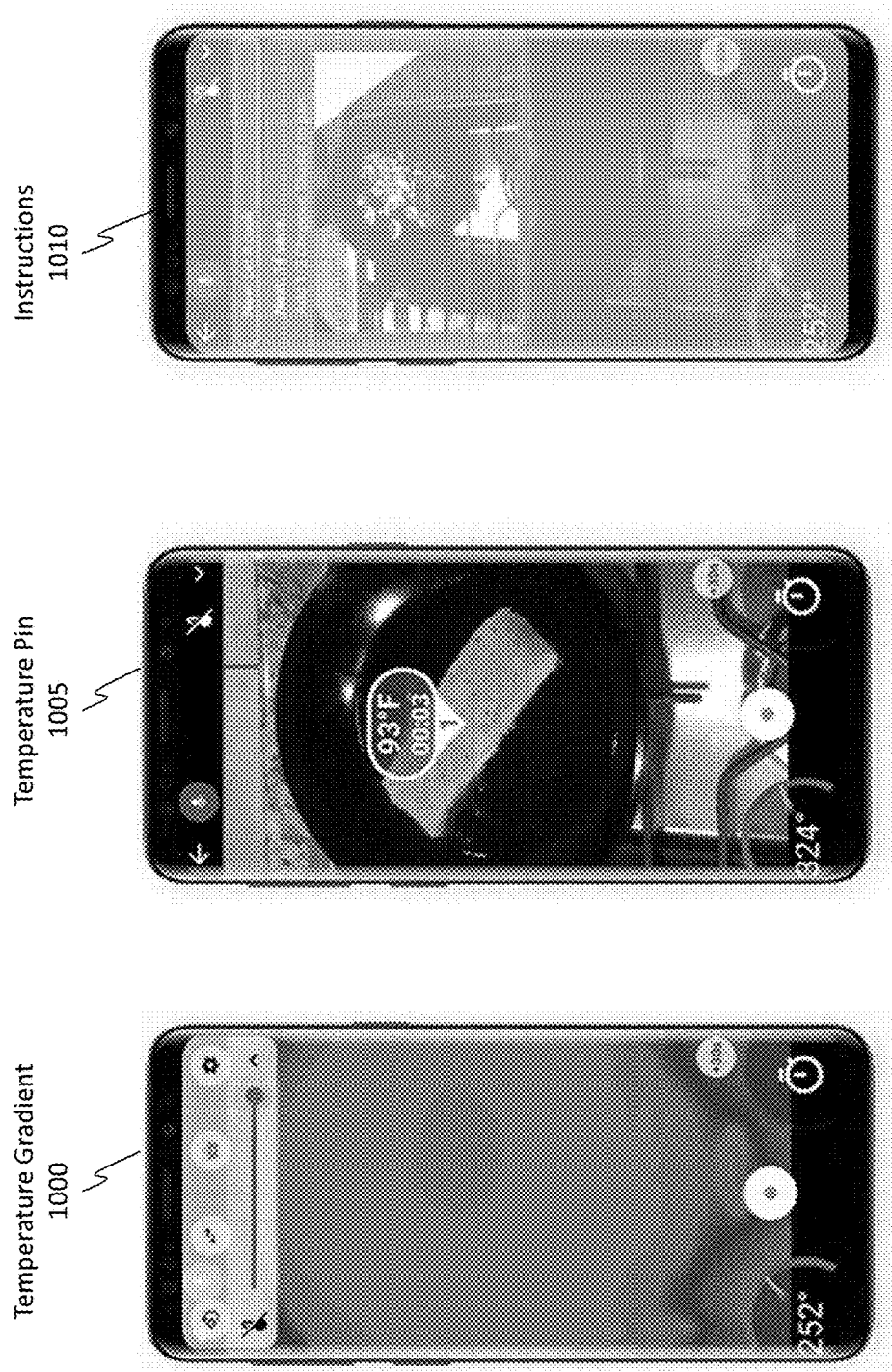
FIG. 10 illustrates various examples of user interfaces that are designed for use on a mobile device.

FIG. 10 shows another set of example user interfaces, which can be displayed on a mobile device. Initially, FIG. 10 shows a user interface comprising a temperature gradient 1000. Notice, this user interface not only displays various color gradients, but it also displays a numeric value for the temperature, such as perhaps the average temperature of a selected or particular area as a whole. For example, a user can draw a shape around a particular area (e.g., the area of a pan) and/or can select a specific area. The embodiments can then display an average temperature for the selected area or a pinpoint temperature for the specific area.

FIG. 10 also shows a user interface comprising a temperature pin 1005. As discussed previously, a user can select a particular area within the user interface and then acquire pin-pointed temperature data for that selected area. In FIG. 10, the user has selected the central area of the piece of meat on the pan. The embodiments can display a temperature pin in the user interface, where the temperature pin indicates the temperature at that particular area.

FIG. 10 also shows a user interface comprising a set of instructions 1010 that can be displayed for a user to follow. The instructions 1010 can include visual instructions and/or audio instructions. The instructions 1010 can operate as a guide for helping a user follow or perhaps even generate a recipe, including preparation, cooking, and presentation.

Figure 11:
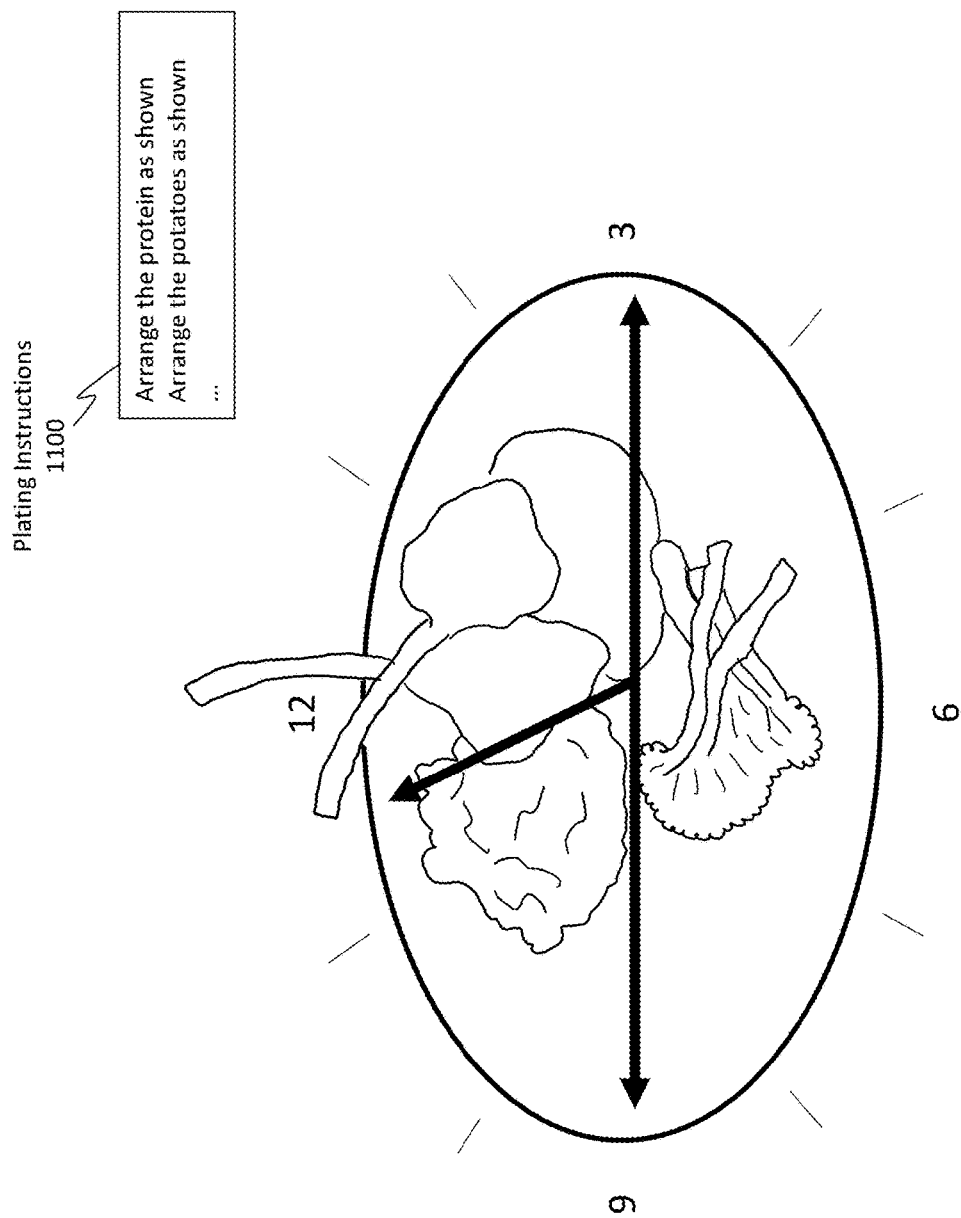
FIG. 11 shows an instruction on how to present or "plate" food after it has been prepared.

FIG. 11 shows another example user interface that shows a set of plating instructions 1100 on how to arrange food on a plate. To illustrate, the plate in FIG. 11 has been symbolically labeled with the units of a clock (e.g., the 12 o'clock direction, 3 o'clock direction, etc.), along with arrow guidelines for how to arrange the vegetables, proteins, and other food products on the plate. As an example, vegetables are to be arranged on the plate below the line spanning between the 3 o'clock indicator and the 9 o'clock indicator. A starch is to be arranged in the upper left quadrant while the protein is to be arranged in the upper right quadrant. Of course, these are examples only and any type of plating or presentation can be followed. Accordingly, the disclosed embodiments are able to provide a set of instructions on how to arrange food products on a platter for aesthetic presentation.

Figure 12:
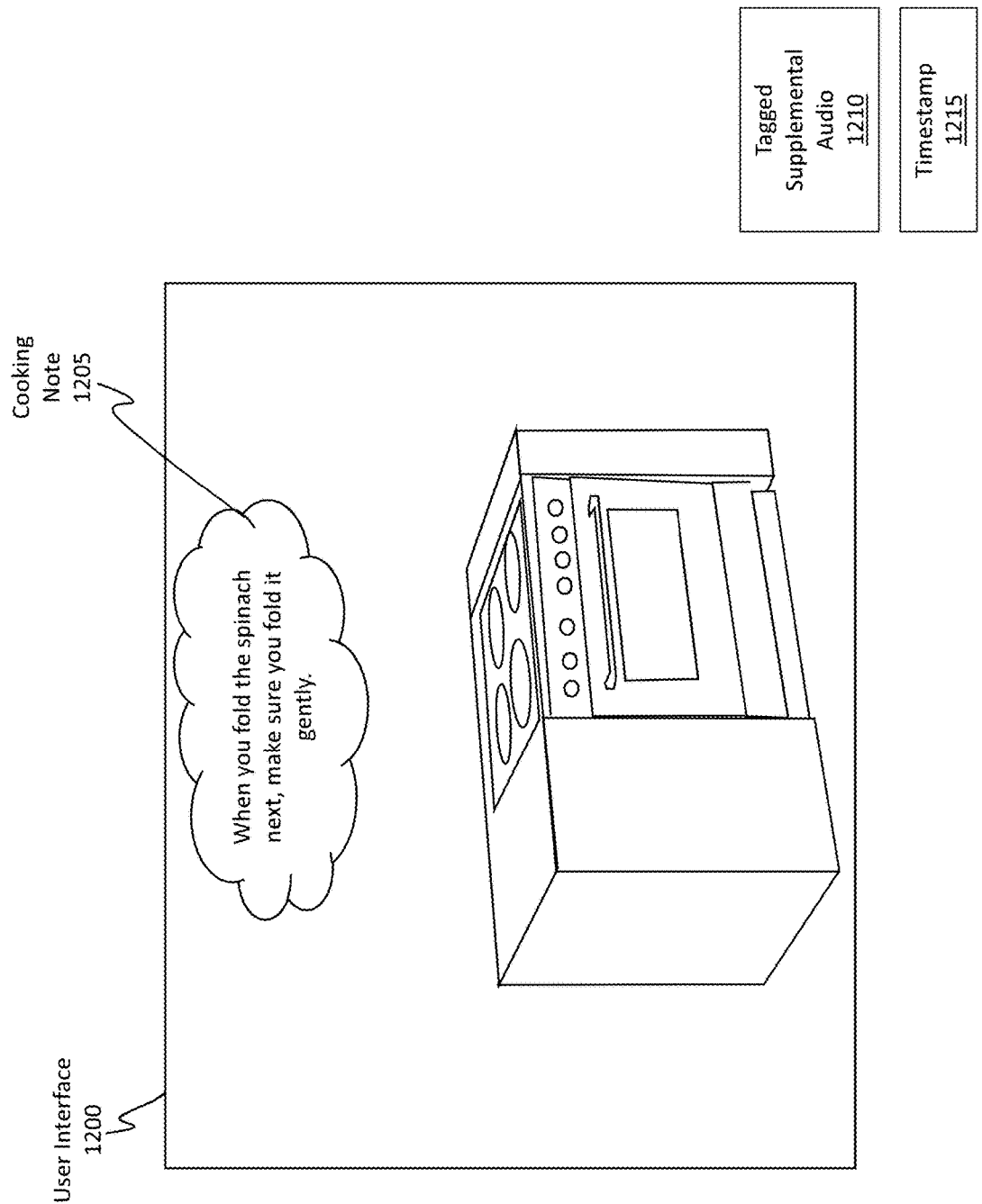
FIG. 12 illustrates another example user interface, where this interface provides tagged supplemental audio.

FIG. 12 shows yet another user interface 1200 that is currently displaying a cooking note 1205. Audio that plays to read the note can be referred to as "tagged supplemental audio 1210," and that audio can be added at a particular timestamp 1215 of a video recording. That is, a cook can generate a video with instructions on how to prepare a meal. After the video is generated, the cook can add additional audio sound clips at particular timestamps in the video, as shown by tagged supplemental audio 1210. The sound clips can be designed to provide further instruction, motivation, or emotional connections with the user who is viewing the video. To illustrate, FIG. 12 shows the cooking note 1205 instructing the user to take special care when folding the spinach. Providing such prompts promotes an emotional bond between a cook and a person following the cook's recipe.

Figure 13:
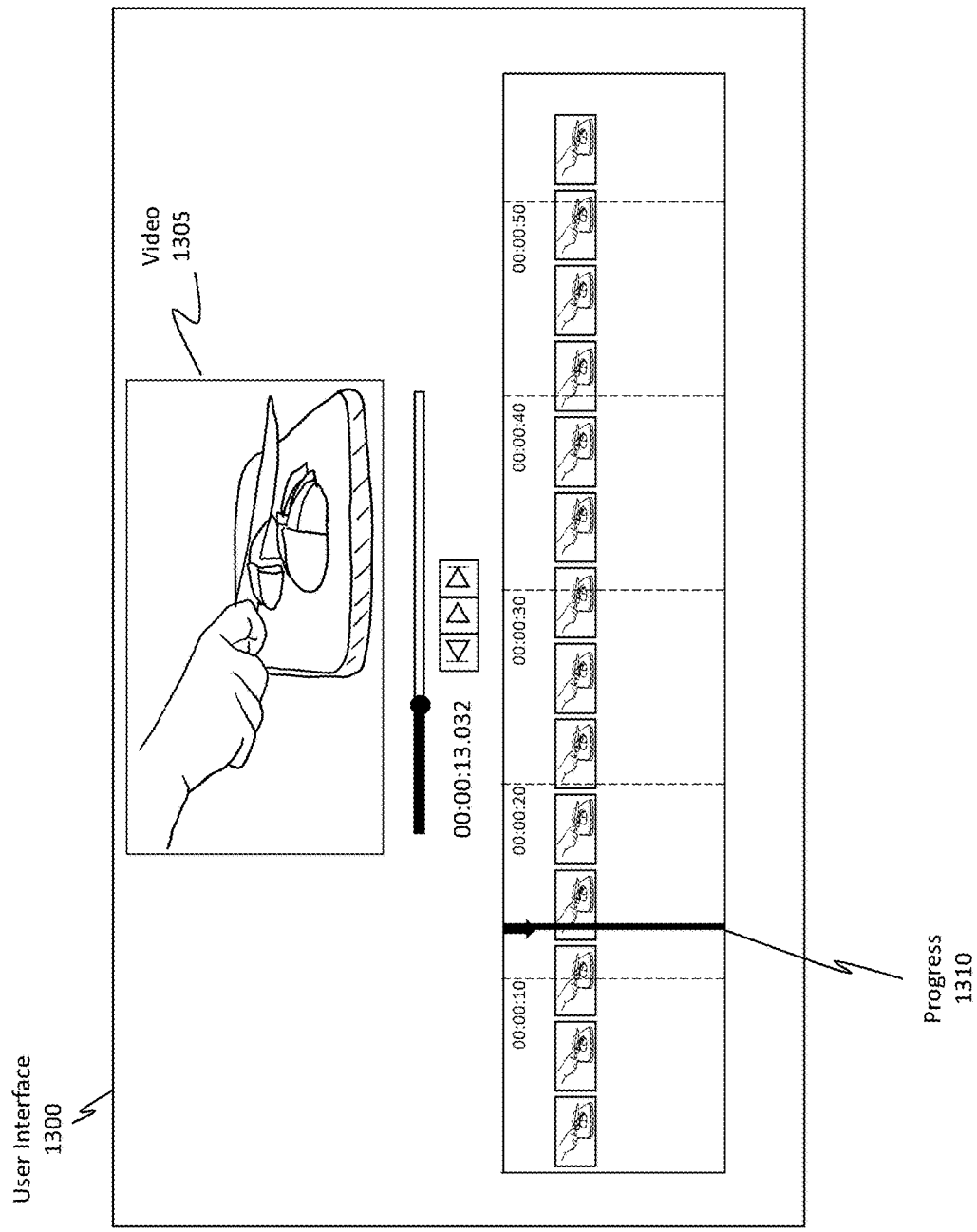
FIG. 13 illustrates a video editing interface.

FIG. 13 shows another example user interface 1300, which is designed to enable a user to view a video 1305, along with the progress 1310 of that video. That is, the user can interact with the user interface 1300 to navigate to a particular portion of a video. In some cases, the user can also use the user interface 1300 to edit the video 1305 such as by cropping the video, adding new video content at a particular time stamp in the video, and so forth. Promotional videos can also be generated by cropping videos and/or by appending multiple video segments together.

Figure 14:
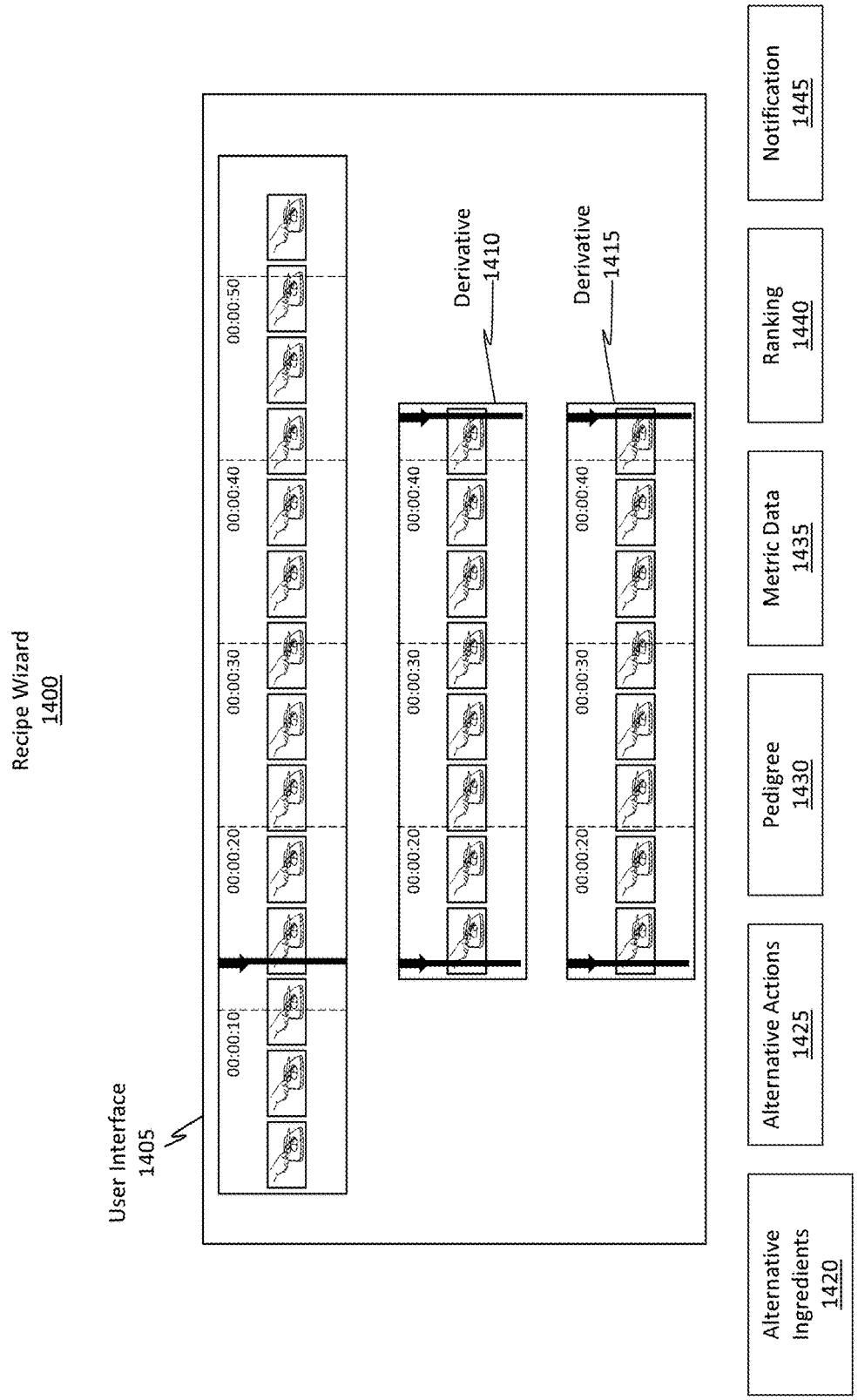
FIG. 14 illustrates how a user can select different alternative or replacement ingredients, and the instructional video can show how to prepare those alternatives.

As discussed previously, it is sometimes the case that a user desires to substitute one ingredient or one step in the recipe for another ingredient or step. The disclosed embodiments can facilitate such substitutions and can even enable a user to effectively "choose your own process" by providing the user with a number of alternative choices when preparing food. FIG. 14 is representative.

FIG. 14 shows a recipe wizard 1400 that enables a user to follow a recipe and to select alternative courses of action and/or alternative ingredients while following that recipe. To illustrate, a user interface 1405 can be displayed. Prior to starting a recipe, the user can select a number of alternatives that he/she would like to use in lieu of the original ingredients or actions recited in a recipe. In some cases, the user can select the alternatives while he/she is in the process of following a recipe. As such, the replacements can occur before a user starts to follow a recipe or even while a user is following a recipe.

In some embodiments, the user interface 1405 can display a listing of alternative options that can be pursued, effectively creating a derivative recipe, as shown by derivative 1410 and derivative 1415. Notice, the derivatives 1410 and 1415 start at about the 00:00:13 mark in the video and end at about the 00:00:43 mark. The derivatives 1410 and 1415 can be used to replace the original section of the video and can be used to enable a user to follow a different step than what was originally provided in the recipe. As an example, instead of dicing onions in the original section of the video, it may be the case that the derivative 1410 has the user sauté onions or some other vegetable. Alternatively, the derivative 1415 may have the user replace the diced onions with green peppers. Accordingly, the embodiments enable a user to dynamically modify a recipe, thereby generating derivative recipes. The user can select alternative ingredients 1420 or even alternative actions 1425 (e.g., sautéed onions instead of sliced onions).

Because of the ability to modify recipes, it is beneficial to also have the ability to track the pedigree 1430 or history of a recipe, including any derivations that spawn off of a recipe. For instance, it may be the case that an original recipe is modified "x" times, thereby producing "x" different derivatives of that recipe. The embodiments are able to track recipes and derivatives in the database mentioned earlier. In some cases, attribution to an original author of a recipe can be promulgated to each of the different derivatives as well.

For instance, the embodiments are able to collect and analyze various metric data 1435 detailing how often a particular recipe is downloaded, followed, or otherwise used by any number of users. The metric data 1435 can then be used to gauge how popular various recipes are. Additionally, the metric data 1435 can be used for promotional or advertisement purposes as well.

Based on the metric data 1435, the embodiments can rank the various recipes stored in the database, as shown by ranking 1440. In some instances, content creators, or rather the authors of recipes, can be notified regarding when they recipes are used, as shown by notification 1445.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 15:
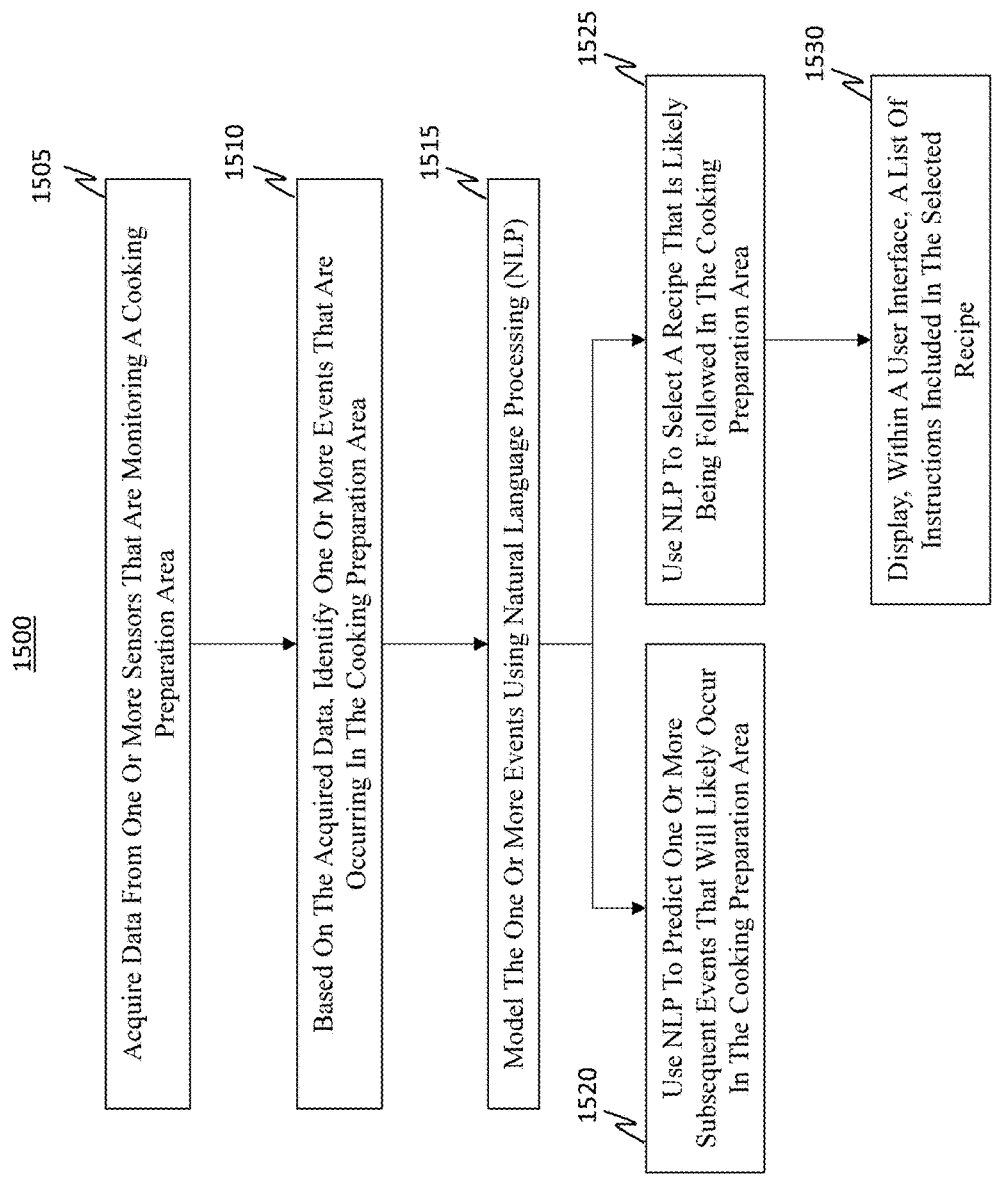
FIG. 15 illustrates a flow chart of an example method for promoting consistent cooking event outcomes by modeling cooking events using natural language processing.

Attention will now be directed to FIG. 15, which shows a flowchart of an example method 1500 for promoting consistent cooking event outcomes by modeling cooking events using natural language processing. The method 1500 can be performed within the architecture 100 of FIG. 1 and using the ML engine 210 and/or the NLP 215 of FIG. 2.

Initially, method 1500 includes an act (act 1505) of acquiring data from one or more sensors that are monitoring a cooking preparation area. For instance, the sensor 110 from FIG. 1 can monitor the preparation area 105. In some implementations, the data can include image data obtained from a camera. In some cases, the data can include thermal imaging data obtained from a thermal imaging camera. Indeed, any type of sensor data can be acquired.

Based on the acquired data, there is an act (act 1510) of identifying one or more events that are occurring in the cooking preparation area. For instance, the ML engine 210 of FIG. 2 (or the NLP 215) can analyze the sensor data to detect events, such as event 415 in FIG. 4A, event 425, and so on. In some embodiments, the events can include one or more of a cooking or ingredient preparation event, a cooking event, or even a plating event. The process of identifying the events can be performed using a machine learning algorithm (e.g., NLP) that analyzes images included in the acquired data.

Act 1515 involves modeling the one or more events using natural language processing (NLP) (e.g., NLP 215 from FIG. 2). As an example, the process of modeling the events can include generating the state machine 300 of FIG. 3. The state machine 300 can include nodes corresponding to actual, detected events. Additionally, the state machine 300 can include nodes corresponding to predicted events that the NLP has predicted might likely occur. In this sense, the NLP can use or rely on a state machine that is generated based, a least in part, on the one or more events.

Act 1520 includes using the NLP to predict one or more subsequent events that will likely occur in the cooking preparation area. These predictions can be included in an NLP-generated model, such as the state machine 300.

Additionally, method 1500 includes an act (act 1525) of using NLP to select a recipe that is likely being followed in the cooking preparation area. For instance, the predicted recipe 450 from FIG. 4B can be one that the user is likely following. As shown in FIG. 8, the predicted recipe can also be displayed in a user interface. Act 1525 can be performed in parallel or in serial with act 1520.

Subsequently, there is an act (act 1530) of displaying, within a user interface, a list of instructions included in the selected recipe. As discussed above, FIG. 8 is illustrative of this act. Optionally, a list of one or more tools can be displayed in the user interface. These tools can be predicted tools that will likely be used to perform the selected recipe. As another option, the user interface can visually show an image of the cooking preparation area. This image can be augmented to include a temperature reading of a particular area of the cooking preparation area. The user interface can further display a user interface element representative of a temperature gradient of an area in the cooking preparation area, as was discussed in FIG. 10. Similarly, the user interface can further display a temperature pin that reflects a temperature of a selected location included in the image of the cooking preparation area. The image can be of the user's own preparation area of an image of another user's preparation area such that the temperature data is the temperature at a different location than where the user is currently located. Optionally, the user interface can display a second list of instructions that detail an arrangement method for arranging or "plating" food objects on a plate.

In some cases, the list of instructions can include one or more of a list of ingredients that are to be prepared for cooking, a list of instructions on how to cook the ingredients, or a list of instructions detailing how to arrange cooked objects on a plate. In some cases, the user interface further displays a video that details the list of instructions, where the video can be augmented with tagged supplemental audio. For instance, after the video is generated, a user can add the supplemental audio in order to provide greater clarity, an emotional bond, or additional instructions. In this sense, the video can be modifiable. For instance, the video can be modified so as to provide one or more options to select alternative ingredients or actions relative to the list of instructions. Optionally, the user interface can be configured to further display a safety alert in response to a detection of one or more conditions that are occurring (e.g., a temperature exceeding a threshold, water boiling over a pan, etc.) or that are predicted will occur in the cooking preparation area.

Figure 16:
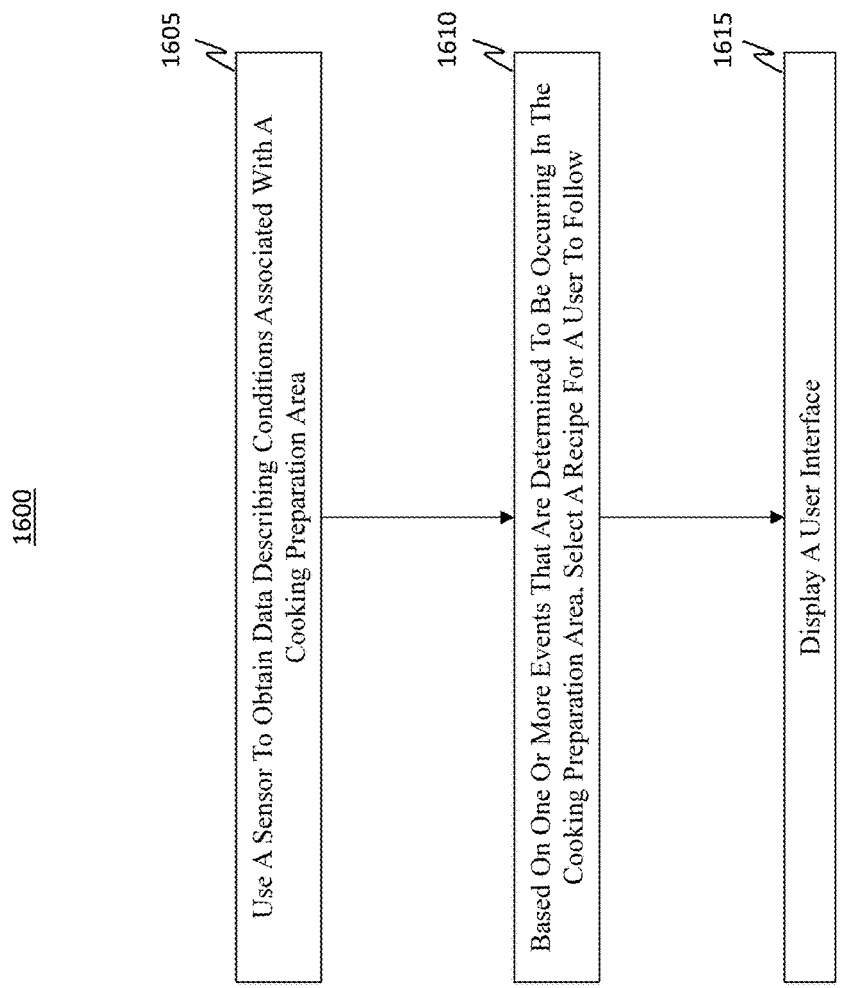
FIG. 16 illustrates a flow chart of an example method for displaying a user interface that is structured to promote consistent cooking event outcomes.

FIG. 16 shows a flowchart of an example method 1600 for displaying a user interface that is structured to promote consistent cooking event outcomes. Method 1600 can be performed using any type of computer system equipped with a display. Details on example computer systems will be provided later.

Initially, method 1600 includes an act (act 1605) of using a sensor to obtain data describing conditions associated with a cooking preparation area. The conditions can be environmental conditions, conditions occurring on a pan, chopping block, or any type of condition.

Based on one or more events that are determined to be occurring in the cooking preparation area, there is an act (act 1610) of selecting a recipe for a user to follow. Additionally, there is an act (act 1615) of displaying a user interface. Notably, the user interface is configured to display any number of items.

As an example, the user interface can optionally display a first user interface element representing a temperature gradient of the cooking preparation area. The temperature gradient can be generated based on the data obtained from the sensor.

Additionally, or alternatively, the user interface can display a second user interface element representing a temperature of a selected area that is selected from within an image representative of the cooking preparation area. Additionally, or alternatively, the user interface can display a list of instructions that are included in the selected recipe. Additionally, or alternatively, the user interface can display a video providing guidance on how to follow the list of instructions that are included in the selected recipe.

In some implementations, the list of instructions can include guidance on how to arrange food products on a plate. In some implementations, the user interface is further configured to display message prompts that provide additional tips on how to follow the list of instructions.

Example Computer/Computer Systems

Figure 17:
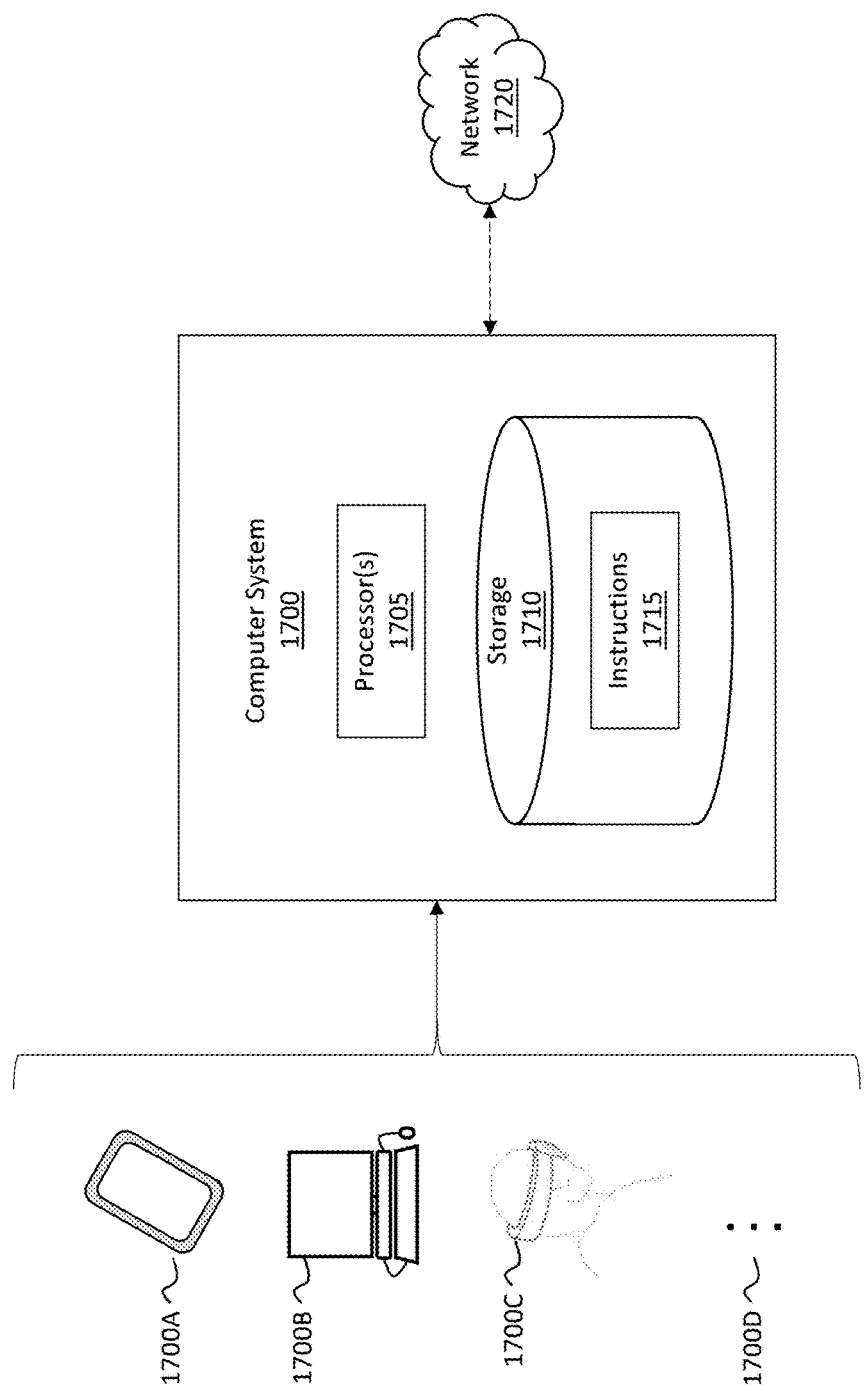
FIG. 17 illustrates an example computer system configured to perform any of the disclosed operations.

Attention will now be directed to FIG. 17 which illustrates an example computer system 1700 that may include and/or be used to perform any of the operations described herein, such as the methods 1500 and 1600. Computer system 1700 may take various different forms. For example, computer system 1700 may be embodied as a tablet 1700A, a desktop or laptop 1700B, a wearable device 1700C, a mobile device, or a standalone device. The ellipsis 1700D indicates that other forms are available as well. Computer system 1700 may also be a distributed system that includes one or more connected computing components/devices that are in communication with computer system 1700.

In its most basic configuration, computer system 1700 includes various different components. FIG. 17 shows that computer system 1700 includes one or more processor(s) 1705 (aka a "hardware processing unit") and storage 1710.

Regarding the processor(s) 1705, it will be appreciated that the functionality described herein can be performed, at least in part, by one or more hardware logic components (e.g., the processor(s) 1705). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "engine," "ML," or even "NLP" can refer to hardware processing units or to software objects, routines, or methods that may be executed on computer system 1700. The different components, modules, engines, and services described herein may be implemented as objects or processors that execute on computer system 1700 (e.g. as separate threads).

Storage 1710 may be physical system memory, which may be volatile, non-volatile, or some combination of the two. The term "memory" may also be used herein to refer to non-volatile mass storage such as physical storage media. If computer system 1700 is distributed, the processing, memory, and/or storage capability may be distributed as well.

Storage 1710 is shown as including executable instructions 1715. The executable instructions 1715 represent instructions that are executable by the processor(s) 1705 of computer system 1700 to perform the disclosed operations, such as those described in the various methods.

The disclosed embodiments may comprise or utilize a special-purpose or general-purpose computer including computer hardware, such as, for example, one or more processors (such as processor(s) 1705) and system memory (such as storage 1710), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RANI, ROM, EEPROM, CD-ROM, solid state drives ("SSD") that are based on RANI, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1700 may also be connected (via a wired or wireless connection) to external sensors (e.g., one or more remote cameras) or devices via a network 1720. For example, computer system 1700 can communicate with any number devices or cloud services to obtain or process data. In some cases, network 1720 may itself be a cloud network. Furthermore, computer system 1700 may also be connected through one or more wired or wireless networks 1720 to remote/separate computer systems(s) that are configured to perform any of the processing described with regard to computer system 1700.

A "network," like network 1720, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1700 will include one or more communication channels that are used to communicate with the network 1720. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RANI and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed is:

1. A method for promoting consistent cooking event outcomes by modeling cooking events using natural language processing, said method comprising:
   acquiring data from one or more sensors that are monitoring a cooking preparation area;
   based on the acquired data, identifying one or more events that are occurring in the cooking preparation area;
   modeling the one or more events using natural language processing (NLP);
   using the NLP to predict one or more subsequent events that will likely occur in the cooking preparation area;
   using the NLP to select a recipe that is likely being followed in the cooking preparation area; and
   displaying, within a user interface, a list of instructions included in the selected recipe, wherein the user interface further displays a user interface element representative of a temperature gradient of an area in the cooking preparation area.

2. The method of claim 1, wherein the data includes image data obtained from a camera, and
   wherein the method further includes at least one of:
      providing a live follow video connection in which remote users follow a video feed capturing operations associated with the list of instructions; or
      providing a simultaneous cooking connection in which multiple users provide collaborative feedback on the list of instructions.

3. The method of claim 1, wherein the data includes thermal imaging data obtained from a thermal imaging camera.

4. The method of claim 1, wherein the one or more events include: a cooking preparation event, a cooking event, or a plating event.

5. The method of claim 1, wherein identifying the one or more events is performed using a machine learning algorithm that analyzes images included in the acquired data.

6. The method of claim 1, wherein a list of one or more tools are displayed in the user interface, the one or more tools being predicted tools that will likely be used to perform the selected recipe.

7. The method of claim 1, wherein the user interface visually shows an image of the cooking preparation area, and wherein the image is augmented to include a temperature reading of a particular area of the cooking preparation area.

8. The method of claim 1, wherein the user interface further displays a temperature pin that reflects a temperature of a selected location included within an image of the cooking preparation area.

9. The method of claim 1, wherein the user interface displays a second list of instructions that detail an arrangement method for arranging food objects on a plate.

10. A computer system configured to promote consistent cooking event outcomes by modeling cooking events using natural language processing, said computer system comprising:
   one or more processors; and
   one or more computer-readable hardware storage devices that store instructions that are executable by the one or more processors to cause the computer system to at least:
      acquire data from one or more sensors that are monitoring a cooking preparation area;
      based on the acquired data, identify one or more events that are occurring in the cooking preparation area;
      model the one or more events using natural language processing (NLP);
      use the NLP to predict one or more subsequent events that will likely occur in the cooking preparation area;
      use the NLP to select a recipe that is likely being followed in the cooking preparation area; and
      display, within a user interface, a list of instructions included in the selected recipe, wherein the user interface further displays a video that details the list of instructions, wherein the video is modifiable and provides one or more options to select alternative ingredients or actions relative to the list of instructions, and wherein the video is further modifiable to generate a shortened video clip.

11. The computer system of claim 10, wherein the list of instructions includes one or more of a list of ingredients that are to be prepared for cooking, a list of instructions on how to cook the ingredients, or a list of instructions detailing how to arrange cooked objects on a plate.

12. The computer system of claim 10, wherein the video is augmented with tagged supplemental audio, and wherein the tagged supplemental audio includes audio instructions that were prerecorded by a specific user to provide additional instructions.

13. The computer system of claim 10, wherein the NLP uses a state machine that is generated based, at least in part, on the one or more events.

14. The computer system of claim 10, wherein the user interface further displays a safety alert in response to a detection of one or more conditions that are occurring or that are predicted will occur in the cooking preparation area.

15. A computer system configured to display a user interface that is structured to promote consistent cooking event outcomes, said computer system comprising:
   a display;
   one or more processors; and
   one or more computer-readable hardware storage devices that store instructions that are executable by the one or more processors to cause the computer system to at least:
      use a sensor to obtain data describing conditions associated with a cooking preparation area;
      based on one or more events that are determined to be occurring in the cooking preparation area, select a recipe for a user to follow; and
      display a user interface, wherein the user interface is configured to display:
         a first user interface element representing a temperature gradient of the cooking preparation area, the temperature gradient being generated based on the data obtained from the sensor; or
         a second user interface element representing a temperature of a selected area that is selected from within an image representative of the cooking preparation area; or
         a list of instructions that are included in the selected recipe; or
         a video providing guidance on how to follow the list of instructions that are included in the selected recipe.

16. The computer system of claim 15, wherein the list of instructions includes guidance on how to arrange food products on a plate.

17. The computer system of claim 15, wherein the user interface is further configured to display:
   message prompts that provide additional tips on how to follow the list of instructions.

* * * * *